(12) United States Patent
Okada

(10) Patent No.: US 8,065,403 B2
(45) Date of Patent: Nov. 22, 2011

(54) INFORMATION PROCESSING SYSTEM, INFORMATION PROCESSING METHOD, AND COMPUTER PROGRAM

(75) Inventor: Ryohei Okada, Tokyo (JP)

(73) Assignee: Sony Corporation, Tokyo (JP)

( * ) Notice: Subject to any disclaimer, the term of this patent is extended or adjusted under 35 U.S.C. 154(b) by 1287 days.

(21) Appl. No.: 11/063,218

(22) Filed: Feb. 21, 2005

(65) Prior Publication Data

US 2005/0198378 A1 Sep. 8, 2005

(30) Foreign Application Priority Data

Mar. 1, 2004 (JP) .............................. P2004-056777

(51) Int. Cl.
*G06F 15/173* (2006.01)
(52) U.S. Cl. ....................................................... 709/223
(58) Field of Classification Search .................. 709/223
See application file for complete search history.

(56) References Cited

U.S. PATENT DOCUMENTS

| | | | |
|---|---|---|---|
| 6,098,091 A | 8/2000 | Kisor | |
| 6,112,225 A | 8/2000 | Kraft | |
| 2005/0188088 A1* | 8/2005 | Fellenstein et al. | 709/226 |

FOREIGN PATENT DOCUMENTS

| | | |
|---|---|---|
| JP | 2000-172657 | 6/2000 |
| JP | 2001-134541 | 5/2001 |
| JP | 2002-132462 | 5/2002 |
| JP | 2002-163241 | 6/2002 |
| JP | 2002342165 | 11/2002 |
| JP | 2002351850 | 12/2002 |
| JP | 2002358289 | 12/2002 |
| JP | 2002366533 | 12/2002 |
| JP | 2002366534 | 12/2002 |
| WO | 93/15457 | 8/1993 |

OTHER PUBLICATIONS

Japanese Office Action (for JP 2004-056777) issued on Feb. 17, 2009.

* cited by examiner

*Primary Examiner* — Jeffrey Pwu
*Assistant Examiner* — Shripal Khajuria
(74) *Attorney, Agent, or Firm* — K&L Gates LLP

(57) ABSTRACT

An information processing system, information processing method, and computer program are provided. The information processing system configured of a plurality of equipments includes an apparatus information acquiring section for acquiring apparatus information as the system as a whole, an expanded function proposing section for proposing expanded functions to be executed by using the respective equipment forming the system, a function management section for managing performance or an apparatus configuration that becomes necessary for making each of the expanded functions executable; and an execution possibility determination section for extracting performance or an apparatus configuration necessary for executing an expanded function proposed by the expanded function proposing section, for comparing with a summation of the apparatus information acquired by the apparatus information acquiring section, and for determining whether or not the expanded function is executable.

19 Claims, 19 Drawing Sheets

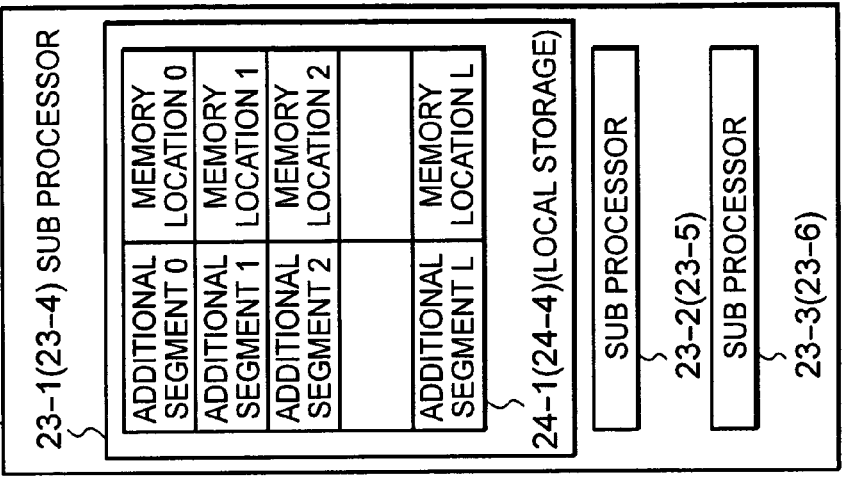
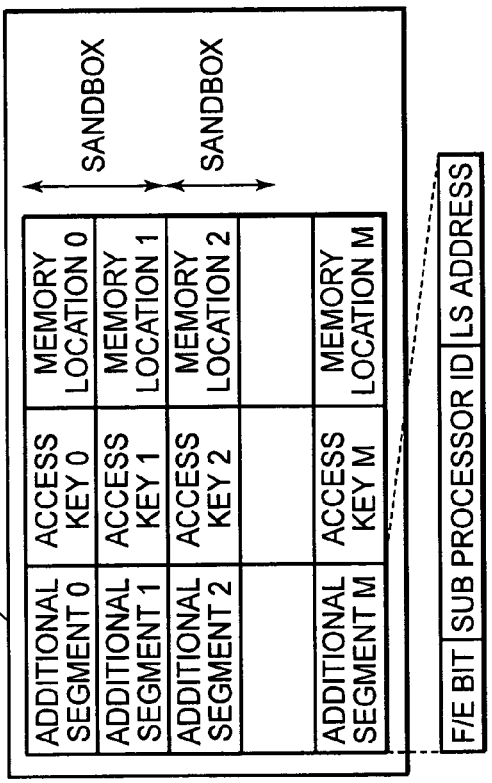

FIG. 16

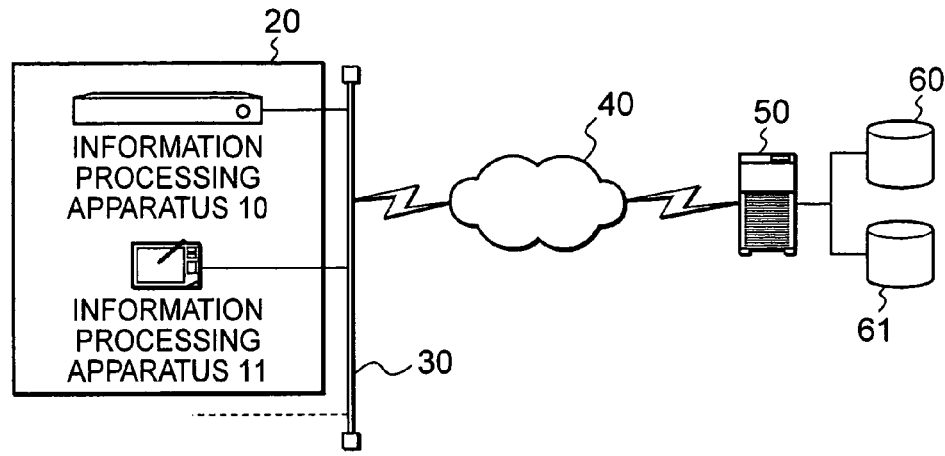

FIG. 17

| |
|---|
| INFORMATION PROCESSING APPARATUS ID |
| INFORMATION PROCESSING APPARATUS TYPE ID |
| MS STATUS |
| MAIN PROCESSOR OPERATION FREQUENCY |
| MAIN PROCESSOR UTILIZATION FACTOR |
| THE NUMBER OF SUB PROCESSOR |
| SUB PROCESSOR ID |
| SUB PROCESSOR STATUS |
| SUB PROCESSOR UTILIZATION FACTOR |
| MAIN MEMORY TOTAL CAPACITY |
| MAIN MEMORY UTILIZATION CAPACITY |
| THE NUMBER OF EXTERNAL RECORDING SECTION |
| EXTERNAL RECORDING SECTION ID |
| EXTERNAL RECORDING SECTION TYPE ID |
| EXTERNAL RECORDING SECTION TOTAL CAPACITY |
| EXTERNAL RECORDING SECTION UTILIZATION CAPACITY |

{ 0: MASTER
  1: SLAVE unused/reserved/busy
(FOR EACH SUB PROCESSOR)

INFORMATION PROCESSING SYSTEM, INFORMATION PROCESSING METHOD, AND COMPUTER PROGRAM

CROSS REFERENCES TO RELATED APPLICATIONS

The present invention claims priority to Japanese Patent Application No. 2004-056777 filed on Mar. 1, 2004, the entire contents of which is incorporated herein by reference.

BACKGROUND OF THE INVENTION

The present invention relates to an information processing system, an information processing method, and a computer program for having operations between two or more networked equipments cooperate with each other, and more particularly relates to an information processing system, an information processing method, and a computer program to have operations between two or more equipments connected by a network cooperate with each other.

Further, the present invention relates to an information processing system, an information processing method, and a computer program by which a plurality of networked equipments performs distributed processing so that they can operate as a single virtual equipment, and particularly to an information processing system, an information processing method, and a computer program to grasp excess processing capacities in the virtual single equipment formed from a plurality of networked equipments, and also expand functions.

It is known that a plurality of computers are connected to each other by a network to implement sharing information resources, sharing hardware resources, and collaboration between a plurality of users. There are connection media between the computers including various types such as a LAN (Local Area Network), a WAN (Wide Area Network), and the Internet.

Particularly recently, computer and network technologies deeply pervade typical homes. Information equipments such as personal computers and PDAs (Personal Digital Assistants), and further, AV equipment such as television receivers and video reproduction apparatus, and various information appliances, CE (Consumer Electronics) equipment and the like in a home are interconnected via a home network. Further, such a home network is, in many cases, interconnected to an external wide area network (WAN), such as the Internet, via a router.

While a mode of use assumed is that a plurality of AV equipments are connected on a home network in this manner, there is a problem that the cooperation implemented between the AV equipments is not sufficient until now.

For such a problem, in order to have the equipments on a network cooperate with each other, research and development on a grid computing technique is underway recently, by which high arithmetic operation performance is implemented through collaborative operation between equipment. Japanese Laid-Open Patent Application No. 2002-342165; Japanese Laid-Open Patent Application No. 2002-351850; Japanese Patent Laid-Open Patent Application No. 2002-358289; Japanese Patent Laid-Open Patent Application No. 2002-366533; and Japanese Patent Laid-Open Patent Application No. 2002-366534.

According to the grid computing technique, a plurality of information processing apparatuses on a network perform distributed processing, so that they can operate as a single information processing apparatus as seen from users.

For example, where a plurality of information processing apparatuses each having a program recording function are connected on a network, a cooperative operation for a program recording reservation can be implemented. That is, where a plurality of information processing apparatuses have their program recording reservation operation cooperating via a home network, they operate virtually as a single recording equipment on the home network. And the user can make a program recording reservation using arbitrary one of the equipments connected to the home network.

Furthermore, through such cooperation in the program recording function, another program (so-called a counter program on a different channel) a recording time of which overlaps with the reserved program can be recorded simultaneously. Similarly, by having reproduction operation of recorded content cooperate between a plurality of equipments, simultaneous/synchronized content reproduction can be implemented. Through the cooperation in a content reproduction function, by having the reproduction of content recorded by different equipment proceed simultaneously and synchronously, it is able to introduce the concept of channel switching in content reproduction.

According to such virtual single equipment, even where the hardware resources and processing capacity of a single equipment may meet a demand from a user, by positively using excess processing capacities in other equipment that operate cooperatively and collaboratively on the network, the demand from the user can be met, whereby even services not practicable by only an usual stand alone single equipment can be implemented.

However, e.g., where a user wishes to expand a function in such virtual single equipment, there is a problem that it is relatively hard to know the current processing capacities. Thus, which function is expandable and what apparatus configuration is required to implement the expandable function are relatively hard to know.

In an usual stand alone single information processing apparatus, it is relatively easy to grasp its apparatus configuration such as its hardware and software. In contrast, where a plurality of information processing apparatuses are cooperatively operating via a network, the configuration of a certain apparatus is not visually seen from another apparatus, and as a result, the current excess processing capacities in a virtual single information processing apparatus may not be easily grasped.

For example, where a specific apparatus tries to make a request to the virtual single information processing apparatus, the specific apparatus may not judge what function is actually is able to be implemented until the excess processing capacities are determined between the networked information processing apparatuses.

Further, even where an added function becomes to be implemented by a combination of information processing apparatuses, what function becomes to be implemented is not proposed in advance before connecting them.

Generally, an information processing apparatus can implement function expansion, e.g., with the addition of peripheral equipment. In contrast, in a virtual single information processing apparatus, due to difficulties in grasping its excess functions, it is difficult to judge which equipment should newly be connected to the network for an expanded function which is newly requested by a user.

SUMMARY OF THE INVENTION

An embodiment of the present invention is to provide an information processing system, an information processing method, and a computer program which are superior and by which a plurality of networked equipments perform distributed processing so that they can operate virtually as a single equipment.

Another embodiment of the present invention is to provide an information processing system, an information processing method, and a computer program which are superior and which are capable of grasping excess processing capacities in a virtual single equipment formed from a plurality of networked equipments, and also expanding functions.

The present invention has been made in consideration of the above problems. According to a first embodiment of the present invention, there is provided an information processing system configured of a plurality of equipments, including: an apparatus information acquiring section for acquiring apparatus information as the above-mentioned system as a whole; an expanded function proposing section for proposing expanded functions to be executed by using the respective equipment forming the above-mentioned system; a function management section for managing performance or an apparatus configuration that becomes necessary for making each of the expanded functions executable; and an execution possibility determination section for extracting performance or an apparatus configuration necessary for executing an expanded function proposed by the above-mentioned expanded function proposing section, for comparing with a summation of the apparatus information acquired by the above-mentioned apparatus information acquiring section, and for determining whether or not the expanded function is executable.

The information processing system according to the embodiment of the present invention further includes an additional apparatus information proposing section for proposing apparatus information to be added in order to make the expanded function executable, when the result of the determination made by the above-mentioned execution possibility determination section is negative.

However, the "system" herein means a logical set of a plurality of apparatuses (or function modules that implement specific functions), and thus whether or not the apparatuses or the function modules are accommodated within a single housing does not matter.

The information processing system according to the embodiment of the present invention, to be specific, operates virtually as a single virtual information processing apparatus through cooperative operation of a plurality of networked information processing apparatuses. In such a case, the above-mentioned apparatus information acquiring section can acquire apparatus information or excess processing capacities from the above-mentioned networked information processing apparatuses, and obtain a summation of the apparatus information of the entire system.

Therefore, according to the embodiment of the present invention, through application of the grid computing technique, if a plurality of networked information processing apparatuses cooperate with each other, a single virtual information processing apparatus can be implemented. And in a system configured as the summation of the respective information processing apparatuses through cooperation of the performance and functions of the virtual information processing apparatus, a section for acquiring performance information necessary for executing each of functions can be provided. According to such a section for acquiring the performance information of the system, excess processing capacities in the virtual single information processing apparatus can be grasped easily, and can also expand functions efficiently, whereby user convenience can be enhanced.

Here, the above-mentioned function management section may manage, in databases, performance and executable functions in each of information processing apparatus, performance of information processing apparatus necessary for implementing each of the functions, functions that become newly executable through cooperative operation of a plurality of information processing apparatuses, respectively. And these databases may be placed on a communication network for use via a predetermined server.

Further, the above-mentioned expanded function proposing section can extract functions that become executable through cooperative operation of each of the above-mentioned information processing apparatuses connected to the network with a different information processing apparatus from a corresponding one of the databases, and lists them up as expandable functions for proposal.

Further, the above-mentioned additional apparatus information proposing section may display, assuming that an information processing apparatus of a type different from that of the above-mentioned information processing apparatus connected on the network is connected, and where an expanded function that becomes newly executable through such a combination exists, information explicitly indicating the corresponding information processing apparatus.

Furthermore, where the above-mentioned virtual information processing apparatus manages the history of functions used in the past and the history of the above-mentioned information processing apparatuses connected to the network in the past, the above-mentioned additional apparatus information proposing section can display an information processing apparatus that has been connected in the past with priority when displaying information explicitly indicating the information processing apparatus.

Furthermore, the above-mentioned execution possibility determination section compares performance or an apparatus configuration that becomes necessary for executing an expanded function with a summation of apparatus information or excess processing capacities of the above-mentioned respective information processing apparatus connected to the network to determine whether or not the expanded function is executable on the basis of whether or not the summation of the apparatus information or the excess processing capacities are insufficient for the performance or the apparatus configuration that becomes necessary.

Furthermore, the above-mentioned additional apparatus information proposing section can search an information processing apparatus that satisfies the performance or the apparatus configuration that is insufficient to execute the expanded function through the corresponding databases, and propose a result thereof. At this instance, the above-mentioned additional apparatus information proposing section may provide such a display as to encourage a user to connect the information processing apparatus searched to the above-mentioned network.

Furthermore, according to a second embodiment of the present invention, there is provided a computer program described in a computer-readable form to process cooperative operation by a plurality of equipments on a computer system, including: an apparatus information acquiring step of acquiring apparatus information from each of the above-mentioned equipments; an expanded function proposing step of proposing expanded functions to be executed using the above-mentioned respective equipment; a function management step of managing performance or an apparatus configuration that becomes necessary for making each of expanded functions executable; and an execution possibility determination step of extracting performance or apparatus configuration necessary for making an expanded function proposed in the abovementioned expanded function proposing step for comparison with a summation of the apparatus information acquired in the above-mentioned apparatus information acquiring step, and determining whether or not the expanded function is executable.

The computer program according to the second embodiment of the present invention defines a computer program described in a computer-readable form so as to implement a predetermined process on a computer system. In other words, if the computer program according to the second embodiment of the present invention is installed in the computer system, collaborative operation is given its full play on the computer system, whereby advantageous effects similar to those obtained by the information processing system according to the first embodiment of the present invention can be obtained.

According to the embodiment of the present invention, if a plurality of networked equipments perform distributed processing through cooperative operation, they can operate virtually as a single equipment. An information processing system, an information processing method, and a computer program which are superior can be provided.

Further, according to the embodiment of the present invention, excess processing capacities in a virtual single equipment formed from a plurality of networked equipments can be grasped, and also function expansion can be performed efficiently. An information processing system, an information processing method, and a computer program which are superior can be provided.

According to the embodiment of the present invention, where a user wishes to use a function that becomes newly usable through cooperation of a plurality of equipments, the types and the number of equipments required can be grasped before the equipments are actually connected. As a result, any necessary function can be obtained in the shortest way without making wasteful connections.

Additional features and advantages of the present invention are described in, and will be apparent from, the following Detailed Description of the Invention and the figures.

BRIEF DESCRIPTION OF THE FIGURES

FIGS. 2A to 2C are diagrams for explaining an accessing procedure from a sub processor 23 to a main memory 26;

FIG. 16 is a diagram schematically showing a configuration of a network system according to an embodiment of the present invention;

FIG. 17 is a diagram showing an example of a configuration of apparatus information;

DETAILED DESCRIPTION OF THE INVENTION

The present invention relates to an information processing system, an information processing method, and a computer program for having operations between two or more networked equipments cooperate with each other, and more particularly relates to an information processing system, an information processing method, and a computer program to have operations between two or more equipments connected by a network cooperate with each other.

Further, the present invention relates to an information processing system, an information processing method, and a computer program by which a plurality of networked equipments performs distributed processing so that they can operate as a single virtual equipment, and particularly to an information processing system, an information processing method, and a computer program to grasp excess processing capacities in the virtual single equipment formed from a plurality of networked equipments, and also expand functions.

An embodiment of the present invention will now be described in great detail with reference to the drawings.

A. System Configuration

The present invention is intended to suitably have operation between two or more information processing apparatuses cooperate with each other via a home network, whereby program recording reservation operation in respective equipment set at different locations is made easy and efficient. In order to have the equipments on the network cooperate with each other, the grid computing technique is positively used, which is to implement high arithmetic operation performance through cooperative operation of equipments.

Figure 1:
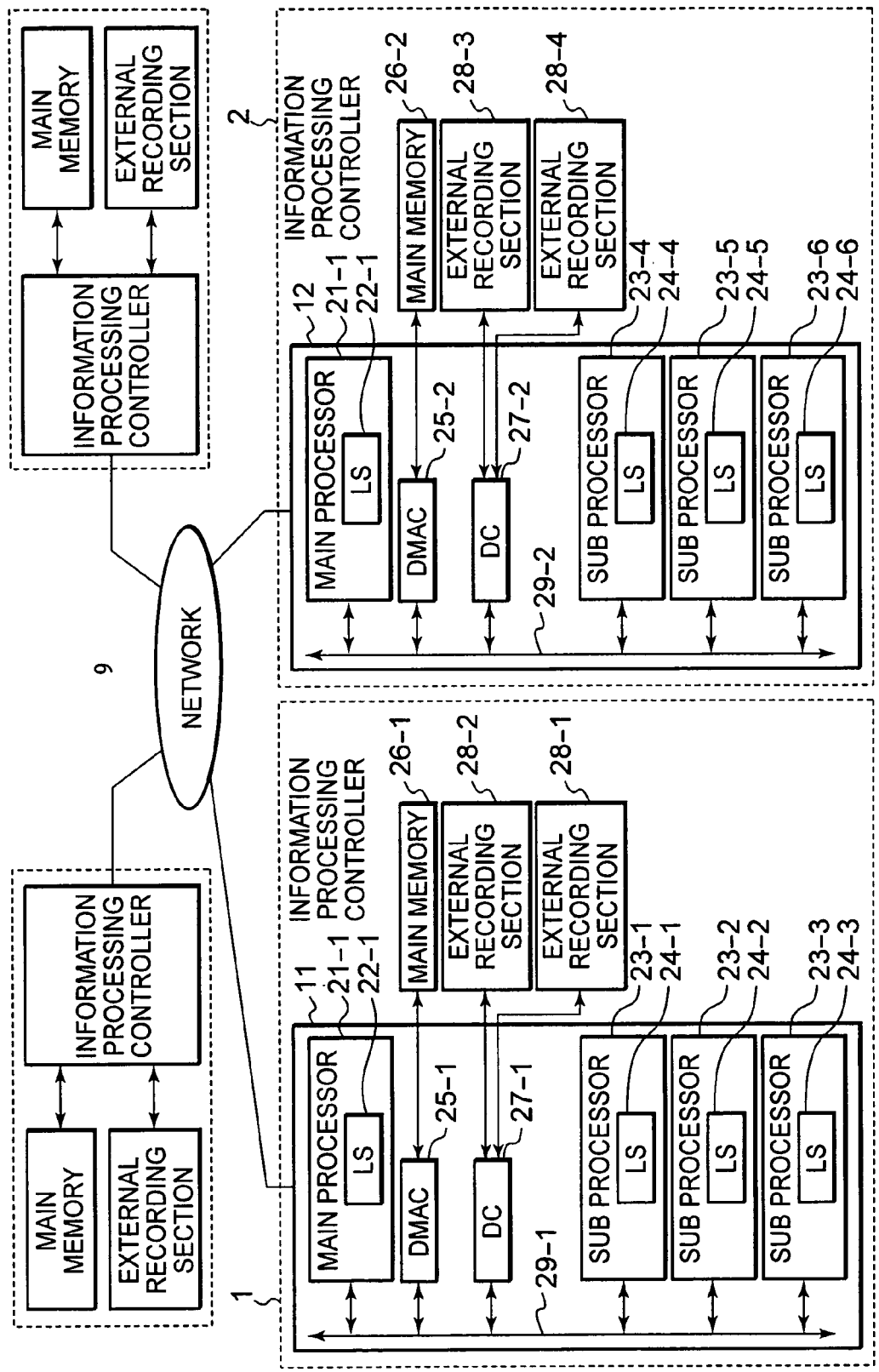
FIG. 1 is a diagram showing a configuration of a network system according to an embodiment of the present invention.

FIG. 1 schematically shows a configuration of a network system configured by applying grid computing.

A network includes the Internet and other wide area networks. A wide area network includes private networks such as a LAN (Local Area Network) and a home network which are connected to gateways to the wide area network. A home network can physically be formed using a standard network interface such as 10 Base-T, 100 Base-TX, or gigabit Ethernet. Further, as a scheme for seeking other equipment on the home network, Upnp (Universal Plug and Play) can be used. According to Upnp, definition files described in the XML (eXtended Markup Language) format are exchanged between networked equipments to perform mutual authentication via addressing processing, seek processing, service request processing. Alternatively, this can be implemented by broadcasting a packet in which regular equipment information is described within the same segment thereof.

On the network, a plurality of information processing apparatus are connected. Examples of the information processing apparatus include AV equipment provided with a recording medium and a program recording function, such as a DVD recorder or a HD recorder, or reproduction-only AV equipment having no recording function, such as a compact disc, and other information processing apparatus. Further, other examples of the information processing apparatus include computing processing systems, such as a PDA and a personal computer. In an example shown in FIG. 1, a plurality of information processing apparatus 1, 2, 3, 4 are connected via a network 9.

A-1. Information Processing Apparatus and Information Processing Controller

The information processing apparatus 1, 2, 3, 4 are, e.g., AV (Audio and Visual) apparatus, and portable apparatus of various types (hereinafter described).

As shown in the figure, the information processing apparatus 1 includes an information processing controller 11 as a computer function section. The information processing controller 11 has a main processor 21-1, sub processors 23-1, 23-2, 23-3, a DMAC (Direct Memory Access Controller) 25-1, and a DC (Disk Controller) 27-1. It is desirable that the information controller 11 be configured as a one-chip IC (Integrated Circuit).

The main processor 21-1 performs schedule management of program execution (data processing) by the sub processors 23-1, 23-2, 23-3, and general management of the information processing controller 11 (information processing apparatus 1). However, the main processor 21-1 may be configured otherwise such that a program other than the program for performing the management operates in the main processor 21-1. In this case, the main processor 21-1 functions also as a sub processor. The main processor 21-1 has an LS (Local Storage) 22-1.

Although each information processing apparatus may have a single sub processor, preferably it includes a plurality of sub processors. In the example shown in the figure, each of the information processing apparatus 1, 2, 3, 4 includes a plurality of sub processors. The sub processors 23-1, 23-2, 23-3 execute programs in parallel and independently of each other to process data under the control of the main processor 21-1. Further, according to circumstances, a program in the main processor 21-1 can operate in cooperation with a program in any of the sub processors 23-1, 23-2, 23-3. Also the sub processors 23-1, 23-2, 23-3 have LSs (local storages) 24-1, 24-2, 24-3, respectively.

The DMAC (Direct Memory Access Controller) 25-1 accesses programs and data stored in a main memory 26-1 connected to the information processing controller 11 and formed from a DRAM (Dynamic RAM) or the like, without intervention of a processor. Further, the DC (Disk Controller) 27-1 controls an accessing operation to external recording sections 28-1, 28-2 connected to the information processing controller 11.

The external recording sections 28-1, 28-2 may have a form of any of a fixed disk (hard disk) and a removable disk. Further, usable as the removable disk are various recording media such as a MO (Magneto-Optical Disk), an optical disk such as a CD±RW or a DVD±RW, a memory disk, an SRAM (Static RAM), a ROM. In short, the DC 27-1 is an external recording section controller although it is called the disk controller. The information processing controller 11 can be configured such that a plurality of external recording sections 28 are connected thereto as shown in FIG. 1.

The main processor 21-1, sub processors 23-1, 23-2, 23-3, DMAC 25-1, and DC 27-1 are interconnected by a bus 29-1.

An identifier is allocated as an information processing apparatus ID to the information processing controller 11. The identifier allows the information processing apparatus 1 incorporating the information processing controller 11 to be uniquely identified throughout the entire network. Further, also to each of the main processor 21-1 and the sub processors 23-1, 23-2, 23-3, an identifier with which it can be identified is similarly allocated as a main processor ID and a sub processor ID, respectively.

Also the other information processing apparatus 2, 3, 4 are configured in a similar manner, and therefore, their description is omitted herein. Here, those units having the same parent number in their reference characters operate similarly unless otherwise specified even if they have different branch numbers. Further, also in the following description, units with their branch numbers omitted do not mean to cause difference due to their branch numbers being different A-2. Accessing from Each Sub Processor to the Main Memory As described above, although each of the sub processors 23 in one information processing controller executes a program independently to process data, where different sub processors perform reading out or writing at a time from or into the same areas in the main memories 26, mismatching of data may possibly occur. Therefore, accessing from the sub processors 23 to the main memory 26 is performed in accordance with a procedure such as described below.

FIG. 2A shows locations within the main memory 26. As shown in the figure, the main memory 26 is formed from memory locations with which a plurality of addresses can be designated. An additional segment for storing information indicating a state of data is allocated to each memory location. The additional segment includes an F/E bit, a sub processor ID, and an LS address (Local Storage address). Further, an access key hereinafter described is allocated to each memory location. The F/E bit is defined as follows.

The F/E bit=0 indicates that data in the corresponding memory location is data being read out and thus processed by a sub processor 23, or invalid data that is not the latest data since the location is in a blank state and is thus disabled from being read out. Further, the F/E bit=0 indicates that data can be written into the corresponding memory location, and the F/E bit is set to 1 after the data is written into the memory location.

The F/E bit=1 indicates that data in the corresponding memory location is not being read out by any sub processor 23 and is thus the latest data not processed as yet. The data in the memory location can be read out, and after the sub processor 23 has read out the data, the F/E bit is set to 0. Further, the F/E bit=1 indicates that the memory location is disabled from writing of data.

Further, in the state of the F/E bit=0 (readout disabled/writing enabled), it is possible to set a readout reservation as to the memory location. When a readout reservation is to be made for a memory location where the F/E bit=0, the sub processor 23 writes the sub processor ID and the LS address of the sub processor 23 as readout reservation information into the additional segment of the memory location reserved for readout.

Thereafter, the sub processor 23 on the data writing side writes the data into the memory location reserved for readout, and when the F/E bit is set to 1 (readout enabled/writing disabled), the data is read out to the sub processor ID and the LS address written as the readout reservation information in the additional segment in advance.

Where it is necessary to process data at multiple stages using a plurality of sub processors, when readout/writing of data of each memory location is controlled as described above, immediately after data processed by the sub processor 23 performing a process at a preceding stage is written into a predetermined address on the main memory 26, another sub processor 23 performing a process at a succeeding stage can read out the pre-processed data.

Further, FIG. 2B shows memory locations of an LS 24 in each sub processor 23. As shown in the figure, also the LS 24 in each sub processor 23 is formed from memory locations with which a plurality of addresses can be designated. An additional segment is allocated similarly to each of the memory locations. The additional segment includes a busy bit.

When a sub processor 23 is to read out data in the main memory 26 into a memory location of its LS 24, it sets the corresponding busy bit to 1 to make a reservation. Other data may not be stored into any memory location where the busy bit is 1. Once data is read out from the memory location of the LS 24, the busy bit is changed to 0 so that the memory location can be used for an arbitrary object thereafter.

As shown in FIG. 2A, the main memory 26 connected to each information processing controller further includes a plurality of sandboxes that define areas within the main memory 26. In the main memory 26 that is formed from a plurality of memory locations, a sandbox is a set of these memory locations. Each sandbox is allocated to each sub processor 23 and can be used exclusively by the corresponding sub processor. That is, each of the sub processors 23 can use a sandbox allocated thereto but may not access data beyond this area.

Further, in order to implement exclusive control of the main memory 26, such a key management table as shown in FIG. 2C is used. The key management table is stored in a comparatively high speed memory such as an SRAM in the information processing controller, and is associated with a DMAC 25. Entries in the key management table include a sub processor ID, a sub processor key, and a key mask.

A process to be performed when the sub processor 23 uses the main memory 26 is as follows. First, the sub processor 23 outputs a readout or writing command to the DMAC 25. This command includes its sub processor ID and an address of the main memory 26, which is a destination of a request for use.

Before the DMAC 25 executes this command, it refers to the key management table to search the sub processor key of the sub processor, which is a source of the request for use. Then, the DMAC 25 compares the searched sub processor key of the source of the request for use with an access key allocated to the memory location shown in FIG. 2A in the main memory 26, which is the destination of the request for use, and executes the above-mentioned command only when the two keys coincide with each other.

A key mask on the key management table shown in FIG. 2C can set, when an arbitrary bit thereof is set to 1, a corresponding bit of the sub processor key associated with the key mask to 0 or 1.

It is assumed that, e.g., the sub processor key is 1010. Usually, with this sub processor key, only access to a sandbox having an access key of 1010 is enabled. However, if the key mask associated with this sub processor key is set to 0001, only a digit in which the bit of the key mask is set to 1 is masked in determining coincidence between the sub processor key and the access key. Consequently, with this sub processor key 1010, access to a sandbox having an access key of 1010 or 1011 is enabled.

The exclusive property of the sandboxes of the main memory 26 is implemented as described above. That is, where data requires to be processed at multiple stages by a plurality of sub processors in an information processing controller, only a sub processor performing a process at a preceding stage and another sub processor performing a process at a succeeding stage are permitted to access a predetermined address of the main memory 26, and consequently, the data can be protected.

Such exclusive control of the memory can be used, e.g., in the following manner. First, immediately after an information processing apparatus is started, the values of the key masks are all zeros. It is assumed that a program in the main processor is executed to operate in cooperation with programs in the sub processors. When it is intended to store processing result data outputted from a first sub processor once into the main memory and then input the processing result data to a second sub processor, the corresponding main memory area may be accessible from both sub processors. In such a case, the program in the main processor changes the values of the key masks suitably to provide a main memory area that is accessible from the plurality of sub processors, to enable multi-stage processing by the sub-processors.

More specifically, when multi-stage processing is to be performed under a procedure of data from a different information processing apparatus→processing by the first sub processor→first main memory area→processing by the second sub processor→second main memory area, the second sub processor may not access the first main memory area if the following settings are maintained.

Sub processor key of the first sub processor, 0100;
Access key of the first main memory area, 0100;
Sub processor key of the second sub processor, 0101;
Access key of the second main memory area, 0101.

Therefore, by setting the key mask of the second sub processor to 0001, the second sub processor is permitted to access the first main memory area.

A-3. Production and Configuration of a Software Cell

In the network system of FIG. 1, a software cell is transmitted between the information processing apparatus 1, 2, 3, 4 so that distributed processing may be performed by the information processing apparatus 1, 2, 3, 4. That is, the main processor 21 included in the information processing controller in a certain information processing apparatus produces a software cell that includes a command, a program, and data, for transmission to another information processing apparatus through the network 9, whereby it can distribute processing.

Figure 3:
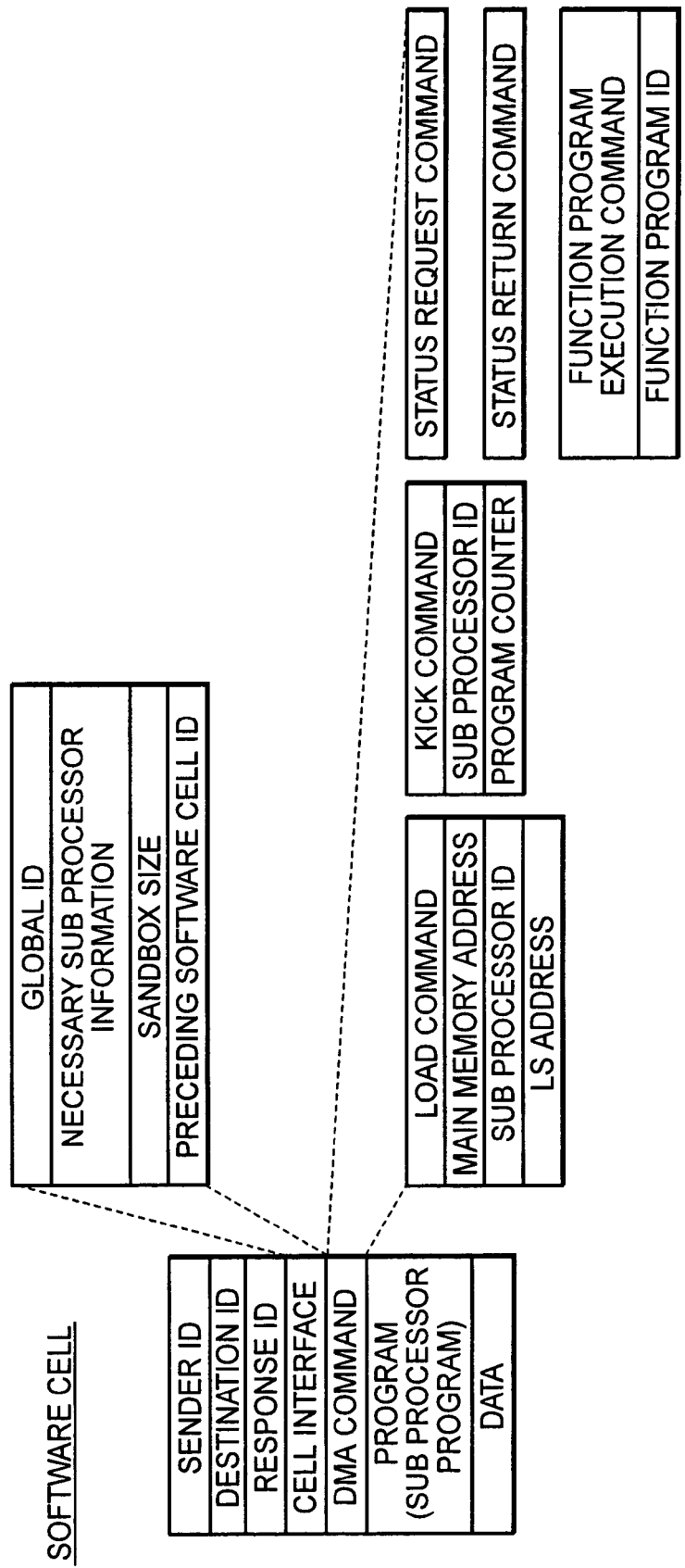
FIG. 3 is a diagram showing an example of a configuration of a software cell.

FIG. 3 shows an example of a configuration of the software cell. The software cell shown in the figure includes a sender ID, a destination ID, a response destination ID, a cell interface, a DMA command, a program, and data.

The sender ID includes a network address of an information processing apparatus which is a sender of the software cell and the information processing apparatus ID of the information processing controller in the information processing apparatus, and further identifiers (main processor ID and sub processor IDs) of the main processor 21 and the sub processors 23 included in the information processing controller in the information processing apparatus.

The sender ID and the response destination ID respectively include the same information about an information processing apparatus which is a destination of the software cell and an information processing apparatus which is a response destination of a result of execution of the software cell.

The cell interface is information necessary for utilizing the software cell, and includes a global ID, necessary sub processor information, a sandbox size, and a preceding software cell ID.

The global ID allows unique identification of the software cell throughout the entire network, and is produced on the basis of the sender ID and the date/time (date and time) of production or transmission of the software cell.

The necessary sub processor information sets therein the number of sub processors necessary for executing the software cell. The sandbox size sets therein memory capacities in the main memory 26 and the LS 24 of each sub processor 23 which are necessary for executing the software cell.

The preceding software cell ID is an identifier of a preceding one of software cells belonging to one group that requires sequential execution of data such as streaming data.

An execution section of a software cell is formed from a DMA command, a program, and data. The DMA command includes a series of DMA commands necessary to start the program, and the program includes sub processor programs to be executed by the sub processors 23. The data here is data to be processed by the program including the sub processor programs.

Further, the DMA command includes a load command, a kick command, a function program execution command, a status request command, and a status return command.

The load command is a command for loading information in the main memory 26 into the LS 24 of a sub processor 23, and includes, in addition to the load command itself, a main memory address, a sub processor ID, and an LS address. The main memory address indicates an address of a predetermined area in the main memory 26, from which the information is loaded. The sub processor ID and the LS address indicate an identifier of the sub processor 23 and an address of the LS 24, to which the information is loaded.

The kick command is a command for starting execution of a program, and includes, in addition to the kick command itself, a sub processor ID and a program counter. The sub processor ID identifies a sub processor 23 for kicking, and the program counter provides an address for a program counter for execution of the program.

The function program execution command is a command (hereinafter described) by which a certain information processing apparatus requests another information processing apparatus to execute a function program. The information processing controller in an information processing apparatus having received the function program execution command identifies a function program to be started from a function program ID (hereinafter described).

The status request command is a command by which it is requested that apparatus information regarding a current operation status (situation) of an information processing apparatus indicated by the destination ID be transmitted to an information processing apparatus indicated by the response destination ID. While the function program is hereinafter described, it is a program that is categorized into a function program in a configuration diagram shown in FIG. 6 of software stored in the main memory 26 of an information processing controller. The function program is loaded into the main memory 26 and executed by the main processor 21.

The status return command is a command by which an information processing apparatus having received the above-mentioned status request command responds, with its apparatus information, to an information processing apparatus indicated by the response destination ID that is included in the status request command.

Figure 4:
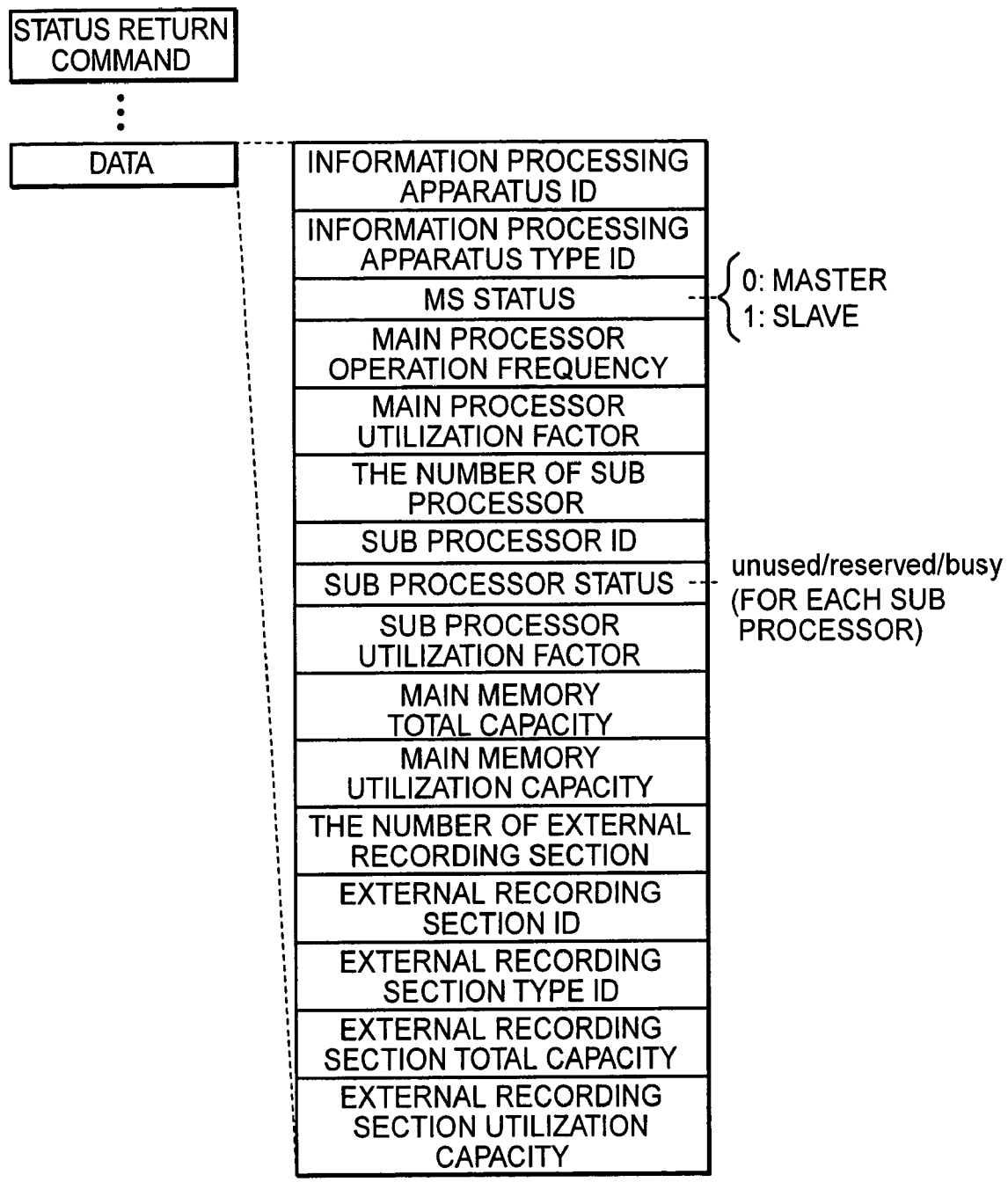
FIG. 4 is a diagram showing a data area of the software cell in a case where a DMA command is a status return command.

FIG. 4 shows a structure of the data area of a software cell where the DMA command is the status return command.

An information processing apparatus ID is an identifier for identifying an information processing apparatus that includes an information processing controller, and represents the ID of an information processing apparatus that transmits the status return command. The information processing apparatus ID is produced by the main processor 21 included in the information processing apparatus when the power is supplied, on the basis of a date/time at which the power is supplied, the network address of the information processing apparatus, the number of sub processors 23 included in the information processing controller in the information processing apparatus, and the like.

An information processing apparatus type ID includes a value representative of a characteristic of the information processing apparatus. The characteristic of the information processing apparatus here is, e.g., a hard disk recorder (hereinafter described), a PDA (Personal Digital Assistants), a portable CD (Compact Disc) player, or the like. Further, the information processing apparatus type ID may be of a type representing a function which the information processing apparatus has, such as video/audio recording or video/audio reproduction. The value representative of a characteristic or a function of an information processing apparatus is determined in advance, and by reading out the information processing apparatus type ID, the characteristic or the function of the information processing apparatus can be grasped.

An MS (Master/Slave) status represents which one of a master apparatus and a slave apparatus the information processing apparatus is operating as, as hereinafter described. Where the MS status is set to 0, it indicates that the information processing apparatus is operating as a master apparatus, and where the MS status is set to 1, it indicates that the information processing apparatus is operating as a slave apparatus.

A main processor operation frequency represents an operation frequency of the main processor 21 in the information processing controller. A main processor utilization factor represents a utilization factor in the main processor 21 of all of programs currently operating in the main processor 21. The main processor utilization factor is a value representing the ratio of the processing capacity being currently used to the total processing capacity of the main processor of interest, and is calculated, e.g., in a unit of MIPS (Million Instructions Per Second), which is a unit for evaluation of the processor processing capacity, or on the basis of a processor utilization time per unit time. This similarly applies also to a sub processor utilization factor hereinafter described.

The number of sub processors represents the number of sub processors 23 included in the information processing controller. A sub processor ID represents an identifier for identifying each of the sub processors 23 in the information processing controller.

A sub processor status represents a status of each sub processor 23, and includes an unused status, a reserved status, a busy status. The unused status indicates that the sub processor is neither used at present nor reserved for use. The reserved status indicates that the sub processor is not used at present but reserved for use. The busy status indicates that the sub processor is currently used.

A sub processor utilization factor represents a utilization factor in the sub processor of a program being executed by the sub processor or being reserved for execution in the sub processor. That is, the sub processor utilization factor indicates a current utilization factor where the sub processor status is busy, and indicates an estimated utilization factor under which the sub processor is planned to be used later where the sub processor status is reserved.

A set of the sub processor ID, sub processor status, and sub processor utilization factor is set to one sub processor 23, and thus, as many sets as the number of sub processors 23 in one information processing controller are set.

A main memory total capacity and a main memory utilization capacity represent a total capacity and a capacity being currently used of the main memory 26 connected to the information processing controller, respectively.

The number of external recording sections represents the number of external recording sections 28 connected to the information processing controller. An external recording section ID is information for uniquely identifying an external recording section 28 connected to the information processing controller. An external recording section type ID represents a type of the external recording section 28 (e.g., a hard disk, a CD±RW, a DVD±RW, a memory disk, an SRAM, a ROM, or the like).

An external recording section total capacity and an external recording section utilization capacity represent a total capacity and a current capacity of an external recording section 28 identified by the external recording section ID, respectively.

A set of the external recording section ID, external recording section type ID, external recording section total capacity, and external recording section utilization capacity is set to one external recording section 28, and thus, as many sets as the number of external recording sections 28 connected to the information processing controller is set. That is, where a plurality of external recording sections are connected to one information processing controller, different external recording section IDs are allocated to the respective external recording sections, and the external recording section type IDs, external recording section total capacities, and external recording section utilization capacities are also managed separately from each other.

A-4. Execution of a Software Cell

The main processor 21 included in the information processing controller in a certain information processing apparatus produces a software cell having such a configuration as described above, for transmission to a different information processing apparatus and the information processing controller in the different information processing apparatus via the network 9. The information processing apparatus as the sender, the information processing apparatus as the destination, the information processing apparatus as a response destination, and the information processing controllers in the apparatus are identified by the above-mentioned sender ID, destination ID, and response destination ID, respectively.

The main processor 21 included in the information processing controller in the information processing apparatus having received the software cell stores the software cell into the main memory 26. Further, the main processor 21 of the destination reads out the software cell, and processes the DMA command included therein.

Specifically, the main processor 21 of the destination first executes the load command. As a result, information is loaded from a main memory address indicated by the load command into a predetermined area of the LS 24 in a sub processor specified by the sub processor ID and the LS address included in the load command. The information loaded here is a sub processor program or data or some other indicated data included in the received software cell.

Next, the main processor 21 outputs a kick command to a sub processor indicated by the sub processor ID included in the kick command together with a program counter similarly included in the kick command.

The indicated sub processor executes the sub processor program in accordance with the kick command and the program counter. And the sub processor stores a result of the execution into the main memory 26, after which it notifies the main processor 21 of completion of the execution.

Note that the processor executing the software cell in the information processing controller in the information processing apparatus as the destination is not limited to a sub processor 23, but it is possible to designate the main processor 21 so as to execute a main memory program such as a function program included in the software cell.

In this case, the information processing apparatus as the sender transmits, to the information processing apparatus as the destination, a software cell which includes a main memory program and data to be processed by the main memory program in place of the sub processor program and whose DMA command is the load command, to cause the main memory program and the data processed thereby to be stored into the main memory 26.

Next, the information processing apparatus as the sender transmits, to the information processing apparatus as the destination, a software cell which includes a main processor ID and a main memory address as to the information processing controller in the information processing apparatus as the destination, an identifier for identifying the main memory program such as a function program ID hereinafter described, and a program counter and whose DMA command is the kick command or the function program execution command, to cause the main processor 21 to execute the main memory program.

As described above, in the network system according to the present embodiment, an information processing apparatus as a sender transmits a sub processor program or a main memory program in the form of a software cell to an information processing apparatus as a destination, and also causes the sub processor program to be loaded into a sub processor 23 included in the information processing controller in the information processing apparatus as the destination, whereby the information processing apparatus as the sender can cause the information processing apparatus as the destination to execute the sub processor program or the main memory program.

Where the program included in the received software cell is a sub processor program, the information processing controller in the information processing apparatus as the destination loads the sub processor program into a designated sub processor. And the information processing controller causes the sub processor to execute the sub processor program or the main memory program included in the software cell.

Accordingly, even if the user does not operate the information processing apparatus as the destination, the sub processor program or the main memory program can be executed automatically by the information processing controller in the information processing apparatus as the destination.

In this manner, any information processing apparatus can acquire, where its information processing controller does not include a sub processor program or a main memory program such as a function program, such programs from another information processing apparatus connected to the network. Further, sub processors can transfer data therebetween in accordance with the DMA system, and by using the sandboxes mentioned above, even where it is necessary to process data at multiple stages within one information processing controller, the processing can be executed at a high speed and with a high degree of security.

A-5. Distributed Processing of the Network System

Figure 5:
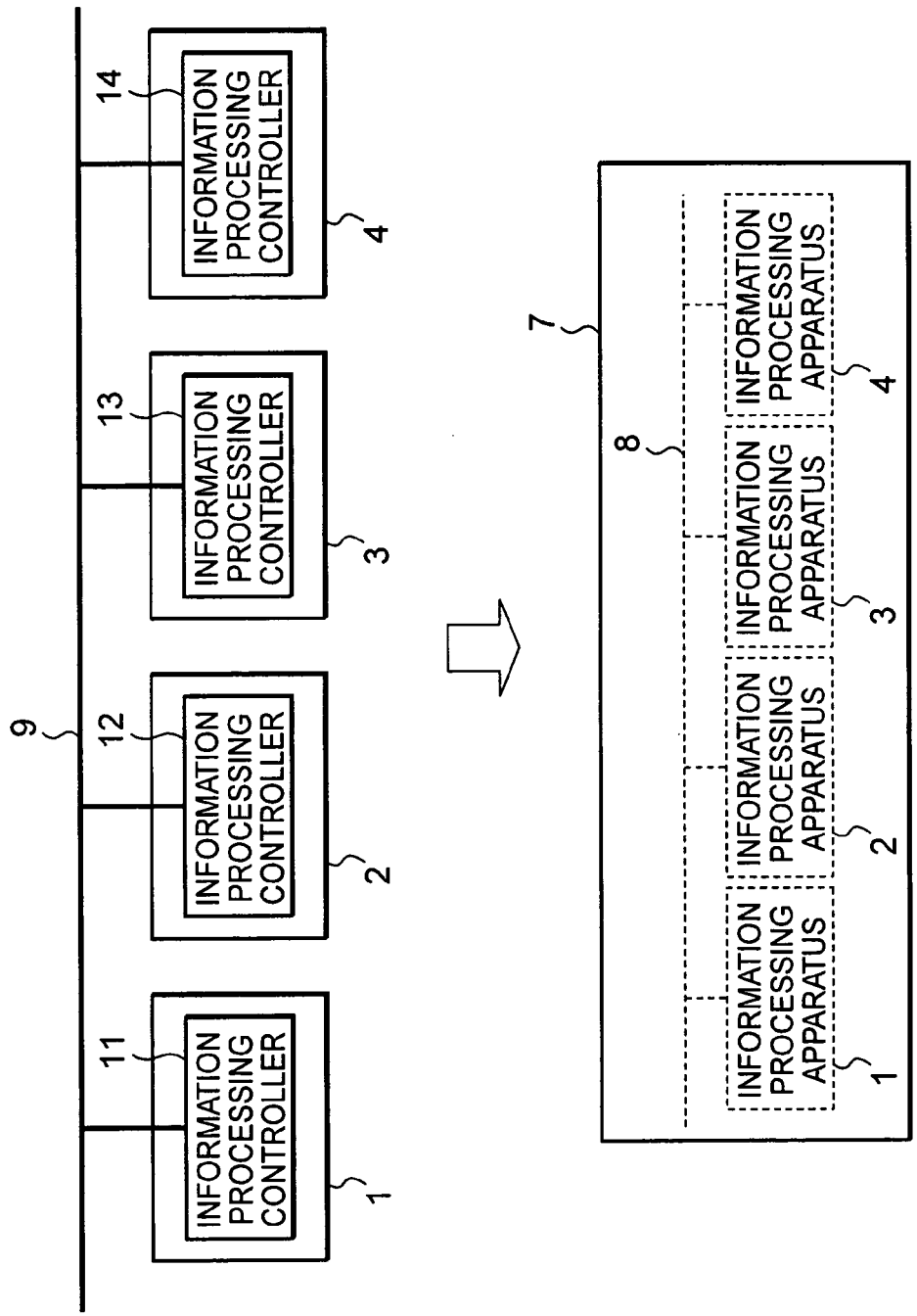
FIG. 5 is a diagram showing how a plurality of information processing apparatus operate as a virtual single information processing apparatus.

FIG. 5 shows how a plurality of information processing apparatus are operating as a virtual single information processing apparatus. As a result of distributed processing through use of a software cell, the plural information processing apparatus 1, 2, 3, 4 connected to the network 9 as shown at the upper stage of the figure operate as a virtual single information processing apparatus 7 as shown at the lower stage of the figure. However, in order to implement such virtual operation, processes described below may be executed by the following configuration.

A-6. Software Configuration of the System and Loading of a Program

Figure 6:
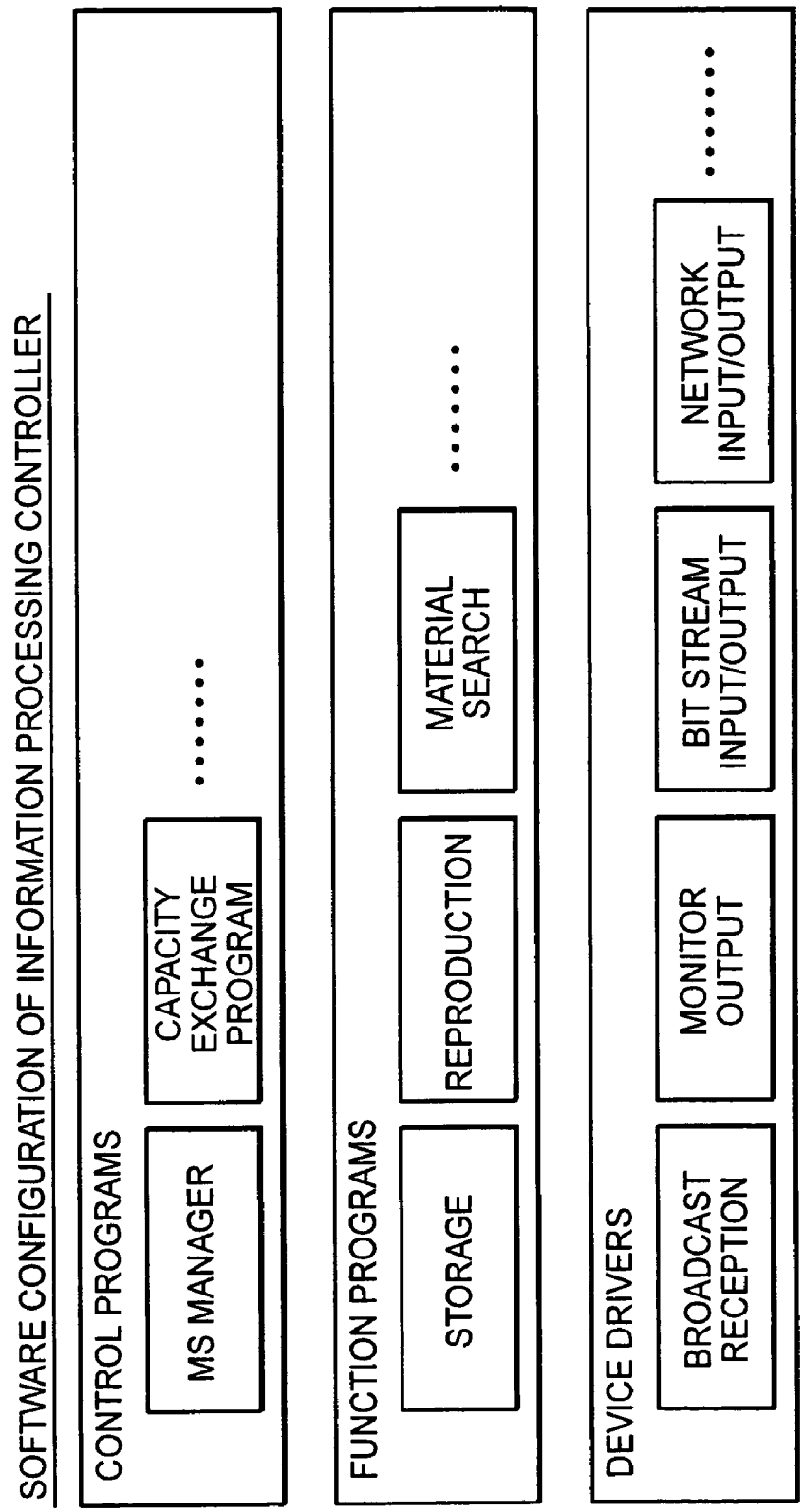
FIG. 6 is a diagram showing an example of a software configuration of an information processing controller.

FIG. 6 shows a configuration of software to be stored by the main memories 26 of the individual information processing controllers. These pieces of software (programs) are recorded in an external recording section 28 connected to the corresponding information processing controller before the power is supplied to the information processing apparatus. The programs are categorized into control programs, function programs, and device drivers according to their function or characteristic.

The control programs are common to each of the information processing controllers, and executed by the main processor 21 of the information processing controller. The control programs include an MS (Master/Slave) manager and a capacity exchange program hereinafter described.

The function programs are executed by the main processors 21, and include programs for recording, reproduction, and material search which are provided for each information processing controller so as to correspond to each information processing apparatus.

The device drivers are provided for input and output (transmission and reception) of each information processing controller (information processing apparatus), and include broadcast reception, monitor output, bit steam input/output, network input/output, which are provided for each information processing controller so as to correspond to each information processing apparatus.

When the power is supplied to an information processing apparatus in a state wherein the information processing apparatus is physically connected to the network 9 by, e.g., inserting a cable, and consequently the information processing apparatus is connected to the network 9 also electrically and functionally, the main processor 21 of the information processing controller of the information processing apparatus loads the programs belonging to the control programs and the programs belonging to the device drives into the main memory 26.

As a program loading procedure, the main processor 21 first causes the DC 27 to execute a reading out instruction to read out the programs from the external recording section 28, and then causes the DMAC 25 to execute a writing instruction to write the programs into the main memory 26.

The programs belonging to the function programs may be configured such that only a necessary one of the programs is loaded when necessary, or otherwise such that all of them are loaded immediately after the main power is supplied similarly to the programs belonging to the other categories.

The programs belonging to the function programs may not necessarily be recorded in the external recording sections 28 of all of the information processing apparatus connected to the network, but as long as they are recorded in an external recording section 28 of any one of the information processing apparatus, they can be loaded from another information processing apparatus by the method described above. As a result, the function programs can be executed by the virtual single information processing apparatus 7 as shown at the lower stage of FIG. 5.

Here, a function program processed by the main processor 21 as described above sometimes operates in cooperation with a sub processor program processed by a sub processor 23. Therefore, when the main processor 21 reads out a function program from an external recording section 28 and writes the function program into the main memory 26, where a sub processor program that is to operate in cooperation with the function program exists, also the sub processor program is written into the same main memory 26 together. In this case, the number of such sub processor programs that operate cooperatively may be either a single number or a plural number. Where the number is a plural number, all of the sub processor programs that operate cooperatively are written into the main memory 26. Each of the sub processor programs written in the main memory 26 is thereafter written into the LS 24 of a sub processor 23 and operates in cooperation with the function program to be processed by the main processor 21.

And a sub processor program ID is allocated to a sub processor program, whereby the sub processor program can be identified uniquely. The sub processor program ID to be allocated may be an identifier having some relationship with the function program ID of a function program which is the other party of the cooperative operation, such as, e.g., an identifier formed form the function program ID as a parent number and a branch number added to the tail end of the parent number. Alternatively, it may be an identifier having no relationship with the function program ID of a function program which is the other party of the cooperative operation. Anyway, where a function program and a sub processor program should operate cooperatively with each other, it is necessary for each of them to mutually retain the program ID which is the identifier of the other party in the program itself. Also where a function program should operate cooperatively with a plurality of sub processor programs, it is necessary for the function program to retain the sub processor program IDs of all of the sub processor programs.

As shown by the software cell of FIG. 3 above, an identifier that can uniquely identify a function program is allocated as a function program ID to each of the function programs. The function program ID is determined from the date/time of creation, the information processing apparatus ID, and the like at the stage of creation of the function program.

The main processor 21 secures, in the main memory 26, an area for storing apparatus information (information regarding an operation status) of the information processing apparatus in which the main processor 21 itself operates, and records the information as an apparatus information table of the self apparatus. The apparatus information here is information, which includes the information processing apparatus ID and the like entered in the data area of the status return command shown in FIG. 4 above.

A-7. Determination of the Master/Slave in the System

In the network system described above, upon supply of the main power to a certain information processing apparatus, the main processor 21 of the information processing controller of the information processing apparatus loads the master/slave manager (hereinafter referred to as "MS manager") into the main memory 26 for execution.

After the MS manager detects the connection to the network 9 of the information processing apparatus in which it operates, it confirms the presence of the other information processing apparatus connected to the same network 9. The "connection" or "presence" here represents the connection to the network 9 of the information processing apparatus not only physically but also electrically and functionally.

The information processing apparatus in which the MS manager itself operates is hereinafter referred to as self apparatus, and any other information processing apparatus is referred to as different apparatus. Also the term "corresponding apparatus" represents the corresponding information processing apparatus.

A method by which the MS manager confirms the presence of a different information processing apparatus connected to the same network 9 is described in the following.

The MS manager produces a software cell that designates the status request command as the DMA command, and designates the corresponding information processing apparatus as the sender ID and the response destination ID, but does not specify the destination ID, for transmission to the network to which the corresponding information processing apparatus is connected, and sets a timer for network connection confirmation. The timeout time of the timer is, e.g., 10 minutes.

Where a different information processing apparatus is connected to the network system, the different apparatus receives the software cell including the status request command, and transmits a software cell that designates the status return command as the DMA command and includes apparatus information of the self apparatus (different apparatus) as the data, to an information processing apparatus which is specified by the above-mentioned response destination ID and which has issued the status request command. The software cell as the status return command includes at least information for specifying the different apparatus (information processing apparatus ID, information regarding the main processor, information regarding a sub processor, or the like), and the MS status of the different apparatus.

The MS manager of the information processing apparatus having issued the status request command supervises reception of the software cell as the status return command transmitted from the different apparatus on the network until timeout occurs with the above-mentioned timer for network connection confirmation. As a result, where the status return command indicating the MS status=0 (master apparatus) is received, the MS status in the apparatus information table of the self apparatus is set to 1. Consequently, the corresponding apparatus becomes a slave apparatus.

On the other hand, where no status return command is received within the time until timeout occurs with the above-mentioned timer for network connection confirmation, or where the status return command indicating the MS status=0 (master apparatus) is not received, the MS status in the apparatus information table of the self apparatus is set to 0. Consequently, the corresponding apparatus becomes a master apparatus.

That is, when a new information processing apparatus is connected to the network 9 in a state wherein no apparatus is connected to the network 9 or in a state wherein a master apparatus does not exist on the network 9, the corresponding apparatus is automatically set as a master apparatus. On the other hand, when a new information processing apparatus is connected to the network 9 in a state wherein a master apparatus exists already on the network 9, the corresponding apparatus is automatically set as a slave apparatus.

In any of the master apparatus and slave apparatus, the MS manager periodically transmits the status request command to a different apparatus on the network 9 to inquire about status information to supervise the situation of the different apparatus. As a result, when the connection state of the network 9 undergoes a variation such as when the main power supply to an information processing apparatus connected to the network 9 is cut or an information processing apparatus is disconnected from the network 9 and consequently the status return command is not returned from the particular different apparatus within a predetermined period of time set for determination in advance, or when a new information processing apparatus is connected to the network 9, the information is conveyed to a capacity exchange program hereinafter described.

A-8. Acquisition of Apparatus Information in the Master Apparatus and a Slave Apparatus When the main processor 21 receives, from the MS manager, a notification of an inquiry about a different apparatus on the network 9 and completion of setting of the MS status of the self apparatus, it executes a capacity exchange program.

The capacity exchange program acquires, where the self apparatus is a master apparatus, apparatus information about all of different apparatus connected to the network 9, i.e., apparatus information about respective slave apparatus.

Acquisition of apparatus information about a different apparatus can be performed, as described above, such that a software cell that designates the status request command as the DMA command is produced for transmission to the different apparatus, and thereafter a software cell that designates the status return command as the DMA command and includes apparatus information about the different apparatus as the data, is received from the different apparatus.

The capacity exchange program secures an area for storing apparatus information of all of the different apparatus (respective slave apparatus) connected to the network 9 in the main memory 26 of the self apparatus, and records the information as apparatus information tables of the different apparatus (slave apparatus), similarly to the apparatus information table of the self apparatus as the master apparatus. That is, in the main memory 26 of the master apparatus, the apparatus information of all of the information processing apparatus connected to the network 9 including the self apparatus is recorded as the apparatus information tables.

On the other hand, where the self apparatus of the capacity exchange program is a slave apparatus, the capacity exchange program acquires apparatus information about all of the different apparatus connected to the network 9, i.e., apparatus information about the master apparatus and all of the slave apparatus other than the self apparatus, and records information processing apparatus IDs and MS statuses included in the apparatus information into the main memory 26 of the self apparatus. That is, in the main memory 26 of each slave apparatus, the apparatus information about the self apparatus is recorded as an apparatus information table, and the information processing apparatus IDs and the MS statuses of all of the master apparatus and the slave apparatus connected to the network 9 other than the self apparatus are recorded as separate apparatus information tables.

Further, in any of the master apparatus and the slave apparatus, when the capacity exchange program receives a notification that an information processing apparatus is newly connected to the network 9, from the MS manager as described above, it acquires apparatus information of the information processing apparatus and records the apparatus information into the main memory 26 as described above.

Note that the MS manager and the capacity exchange program may be executed not only by the main processor 21 but by any sub processor 23 as well. Further, the MS manager and the capacity exchange program preferably are resident programs that operate normally while the main power is supplied to the information processing apparatus.

A-9. Where an Information Processing Apparatus is Disconnected from the Network

In any of the master apparatus and the slave apparatus, when the capacity exchange program is notified from the MS manager as described above that the main power supply to an information processing apparatus connected to the network 9 is disconnected or an information processing apparatus is disconnected from the network 9, it deletes the apparatus information table of the information processing apparatus from the main memory 26 of the self apparatus.

Further, where the information processing apparatus disconnected from the network 9 is the master apparatus, another master apparatus is determined newly by a method such as described below.

For example, each of the information processing apparatus that are not disconnected from the network 9 replaces the information processing apparatus IDs of the self apparatus and the different apparatus with numerical values, and compares the information processing apparatus ID of the self apparatus with the information processing apparatus IDs of the different apparatus. Where the information processing apparatus ID of the self apparatus is the lowest of the IDs of the information processing apparatus that are not disconnected from the network 9, the slave apparatus changes itself to the master apparatus and sets the MS status to 0. Then, it operates as the master apparatus, and acquires apparatus information of all of the different apparatus (slave apparatus) connected to the network 9 for recording into the main memory 26 as described above.

A-10. Distributed Processing Based on Apparatus Information

In order to allow a plurality of information processing apparatus 1, 2, 3, 4 connected to the network 9 to operate as a virtual single information processing apparatus 7 as shown at the lower stage of FIG. 5 above, it is necessary for the master apparatus to grasp operation of a user and operation status of the slave apparatus.

Figure 7:
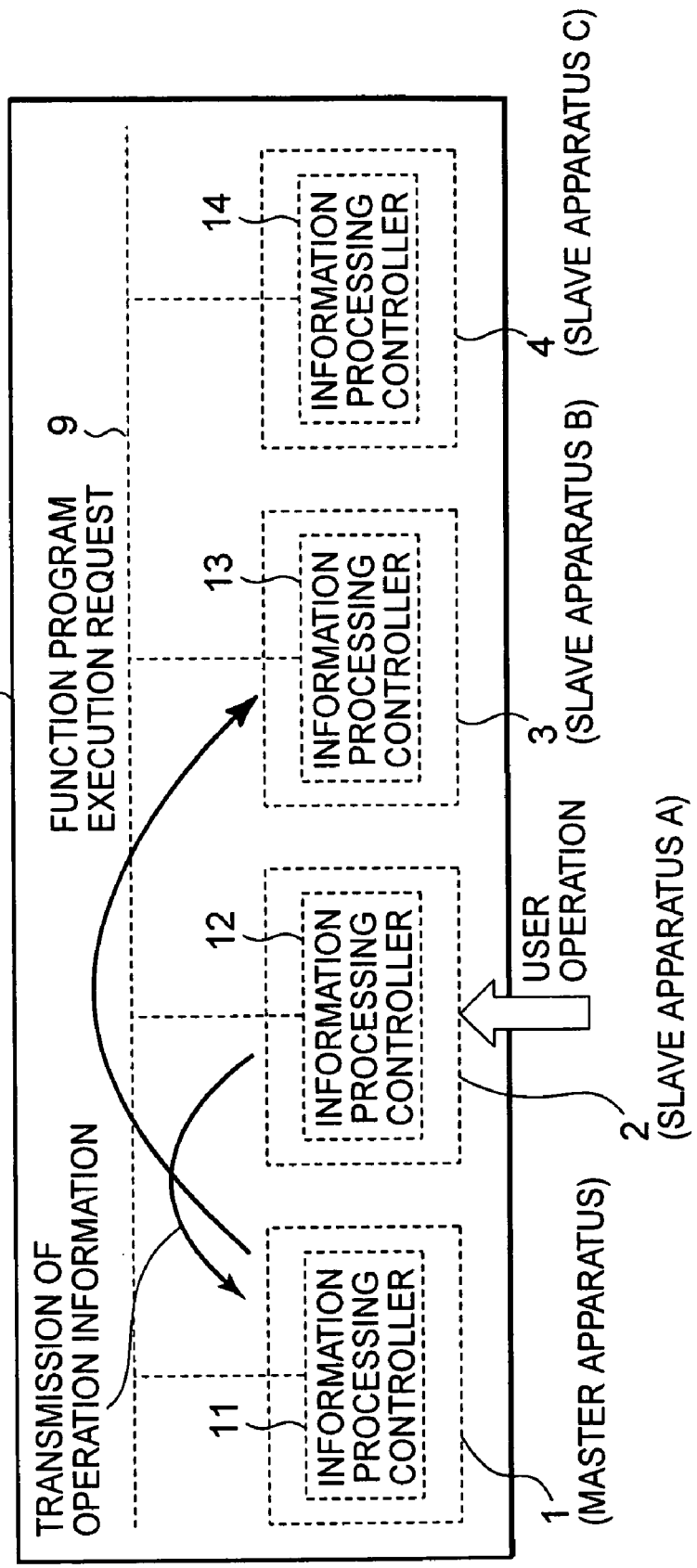
FIG. 7 is a diagram showing how four information processing apparatus operate as a virtual single information processing apparatus.

FIG. 7 shows how four information processing apparatus operate as the virtual single information processing apparatus 7. In an example shown in the figure, the information processing apparatus 1 acts as the master apparatus, while the information processing apparatus 2, 3, 4 act as slave apparatus A, B, C, respectively.

When a user operates any of the information processing apparatus connected to the network 9, if the object of the operation is the master apparatus 1, the operation information is grasped directly by the master apparatus 1. On the other hand, if the object of the operation is a slave apparatus, the operation information is transmitted from the operated slave apparatus to the master apparatus 1. That is, irrespective of whether the object of operation by the user is the master apparatus 1 or one of the slave apparatus, the master apparatus 1 frequently grasps the operation information. Transmission of the operation information is performed, e.g., using a software cell whose DMA command is an operation information transmission command.

Then, the main processor 21-1 included in the information processing controller 11 in the master apparatus 1 selects a function program to be executed in accordance with the operation information. In this instance, if necessary, the main processor 21-1 included in the information processing controller 11 in the master apparatus 1 loads the function program from the external recording sections 28-1, 28-2 of the self apparatus into the main memory 26-1 using the method described above. However, a different information processing apparatus (slave apparatus) may transmit the function program to the master apparatus 1.

The function program defines required specifications (refer to FIG. 4) regarding apparatus such as an information processing apparatus type ID, a processing capacity of the main processor or a sub processor, a main memory utilization capacity, and conditions relating to an external recording section, which are required for each unit of execution thereof.

The main processor 21-1 included in the information processing controller 11 in the master apparatus 1 reads out such required specifications that are required by the respective function programs. Further, the main processor 21-1 refers to the apparatus information tables recorded in the main memory 26-1 by the capacity exchange program in advance to read out the apparatus information about the respective information processing apparatus. The apparatus information here means the items of information including the information processing apparatus ID and subsequent items shown in FIG. 4 above, and is information regarding the main processor, sub processors, main memory, and external recording sections.

The main processor 21-1 included in the information processing controller 11 in the master apparatus 1 successively compares the above-mentioned apparatus information about the information processing apparatus connected to the network 9 with the required specifications necessary for executing the function program.

For example, where the function program requires a recording function, the main processor 21-1 included in the information processing controller 11 in the information processing apparatus 1 specifies and extracts only those information processing apparatus, which have the recording function, on the basis of the information processing apparatus type IDs. Further, the main processor 21-1 specifies one of the slave apparatus that can assure the processing capacity of the main processor or a sub processor, the main memory utilization capacity, and conditions regarding an external recording section in order to execute the function program, as an execution request candidate apparatus. Here, where a plurality of execution request candidate apparatus are specified, one of the execution request candidate apparatus is specified and selected.

Once a slave apparatus to which execution is requested has been specified, the main processor 21-1 included in the information processing controller 11 in the master apparatus 1 updates the apparatus information table as to the specified slave apparatus recorded in the main memory 26-1 included in the information processing controller 11 in the self apparatus.

Further, the main processor 21-1 included in the information processing controller 11 in the information processing apparatus 1 produces a software cell that designates the function program execution command as the DMA command, and sets necessary sub processor information and a sandbox size (refer to FIG. 3) regarding the function program to the cell interface of the software cell, for transmission to the above-mentioned slave apparatus to which execution is requested.

The slave apparatus requested to execute the function program executes the function program, and updates the apparatus information table of the self apparatus. In this instance, if necessary, the main processor 21 included in the information processing controller in the slave apparatus loads the function program and a sub processor program that operates cooperatively with the function program from an external recording section 28 of the self apparatus into the main memory 26 using the method described above.

The system may be configured such that, if the necessary function program or the sub processor program that operates cooperatively with the function program is not recorded in any of the external recording sections 28 of the slave apparatus requested to execute the function program, a different information processing apparatus transmits the function program or the sub processor program to the slave apparatus requested to execute the function program.

The sub processor program may also be executed by a different information processing apparatus using the load command and the kick command described above.

After the execution of the function program comes to an end, the main processor 21 included in the information processing controller in the slave apparatus having executed the function program transmits an execution end notification to the main processor 21-1 included in the information processing controller 11 in the master apparatus 1, and updates the apparatus information table of the self apparatus. The main processor 21-1 included in the information processing controller 11 in the master apparatus 1 receives the end notification, and updates the apparatus information table of the slave apparatus having executed the function program.

The main processor 21-1 included in the information processing controller 11 in the master apparatus 1 may possibly select the self apparatus as an information processing apparatus that can execute the function program, from a result of the reference to the apparatus information tables of the self apparatus and the different apparatus. In this case, the master apparatus 1 executes the function program.

Distributed processing will be described with reference to FIG. 8, in which a user operates, in the example shown in FIG. 7, the slave apparatus A (information processing apparatus 2), and the different slave apparatus B (information processing apparatus 3) executes a function program in response to the operation.

Figure 8:
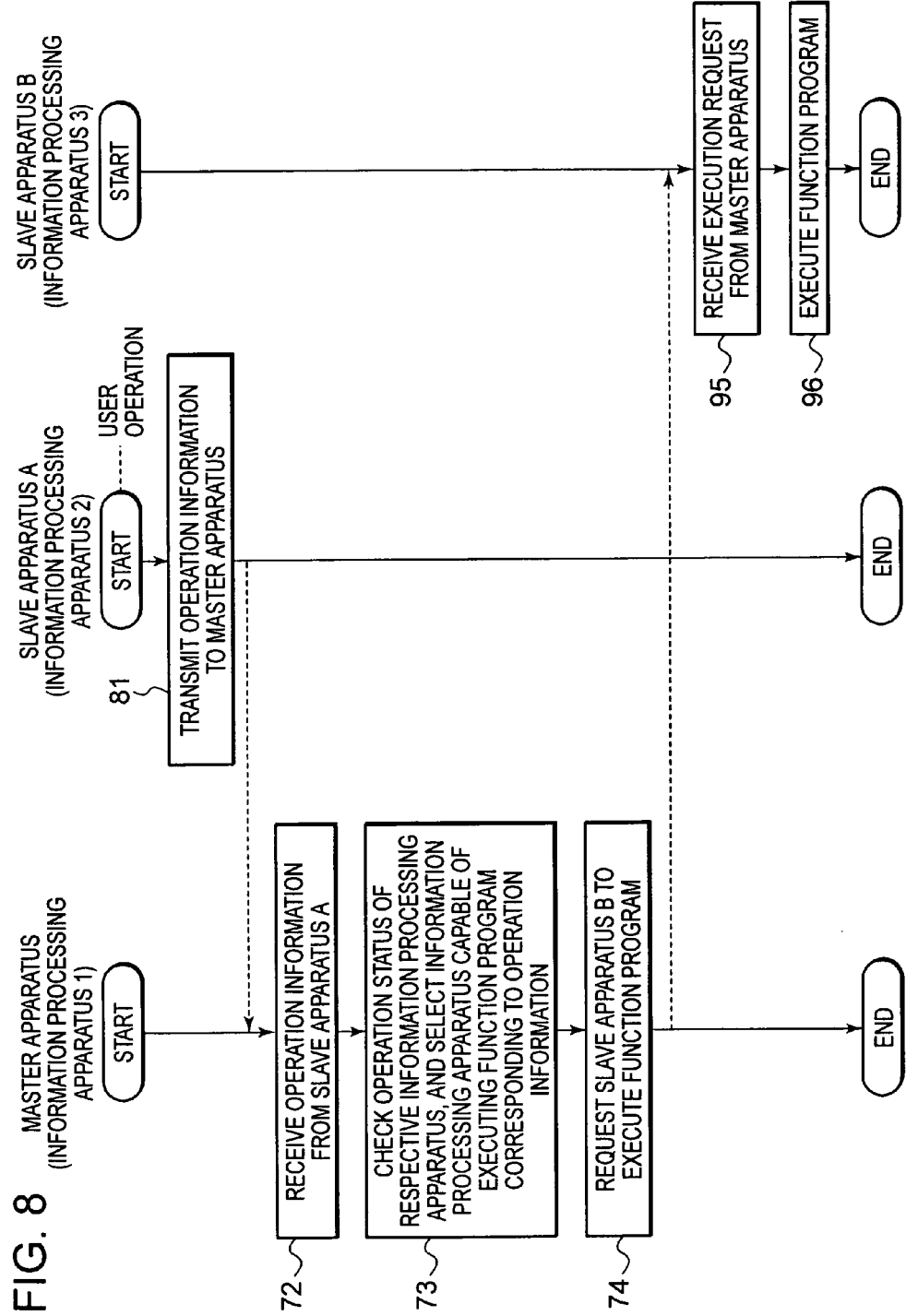
FIG. 8 is a diagram showing an example of distributed processing in a system shown in FIG. 7.

In an example shown in FIG. 8, when the user operates the slave apparatus A, distributed processing of the entire network system including the slave apparatus A is started, and the slave apparatus A first transmits operation information to the master apparatus 1 in step 81.

The master apparatus 1 receives the operation information in step 72, and checks the operation statuses of the information processing apparatus with the apparatus information tables of the self apparatus and the different apparatus recorded in the main memory 26-1 of the self apparatus to select an information processing apparatus that can execute a function program corresponding to the operation information received in step 73. In the example shown in the figure, the slave apparatus B is selected.

Next, the master apparatus 1 requests the selected slave apparatus B to execute the function program in step 74.

The slave apparatus B receives the execution request in step 95, and further executes the function program whose execution is requested in step 96.

In this manner, if a user operates only one of the information processing apparatus, the user can cause the plural information processing apparatus 1, 2, 3, 4 to operate as the virtual single information processing apparatus 7 without operating any other one of the information processing apparatus.

A-11. Specific Examples of the Information Processing Apparatus and the System

Figure 9:
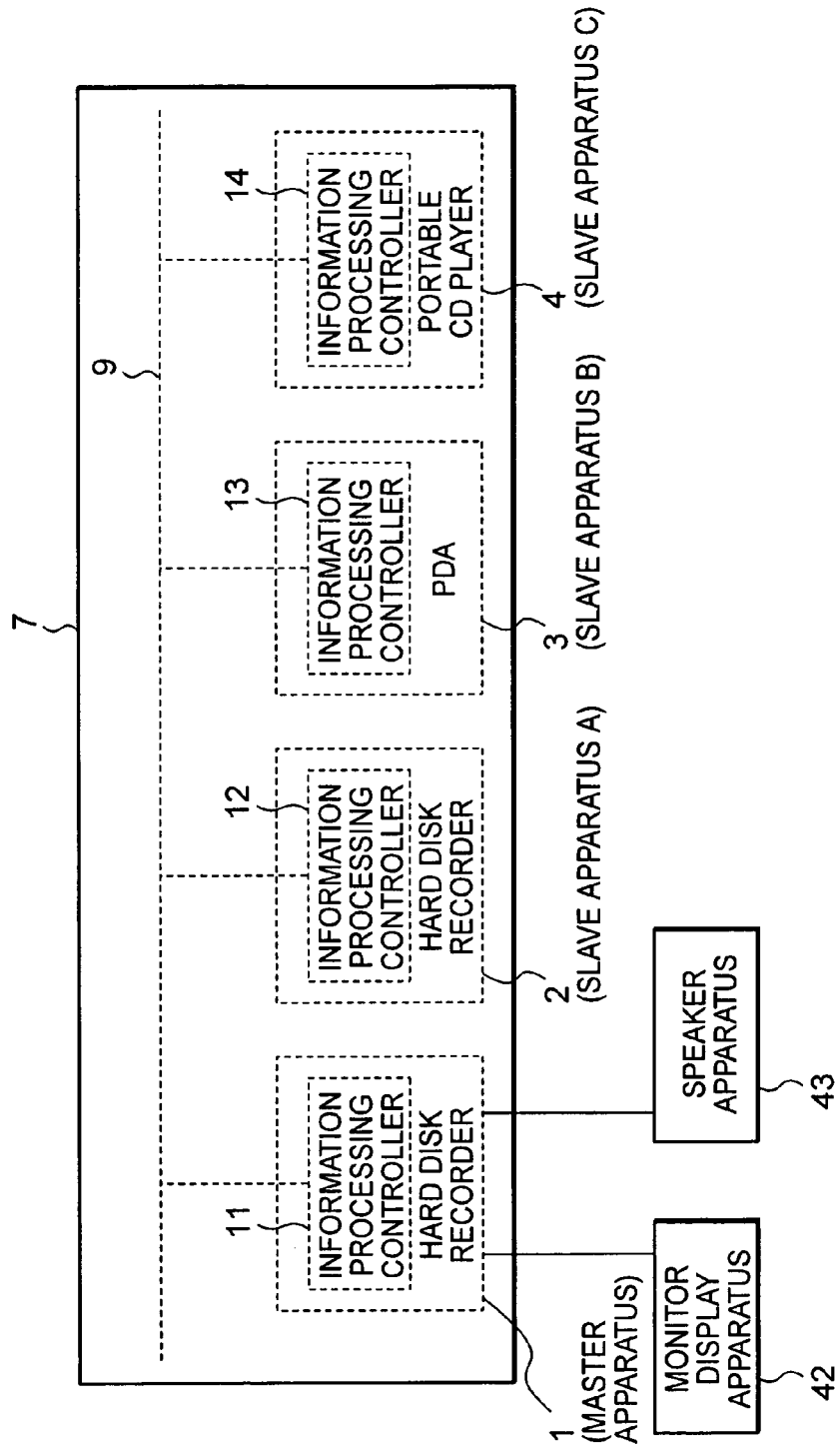
FIG. 9 is a diagram showing a specific example of the respective information processing apparatus and the system.

Each of the information processing apparatus 1, 2, 3, 4 interconnected via the network 9 may basically have any configuration only if information processing is performed by such an information processing controller 11, 12, 13, 14 as described above. FIG. 9 shows an example of a configuration of the information processing apparatus.

Figure 10:
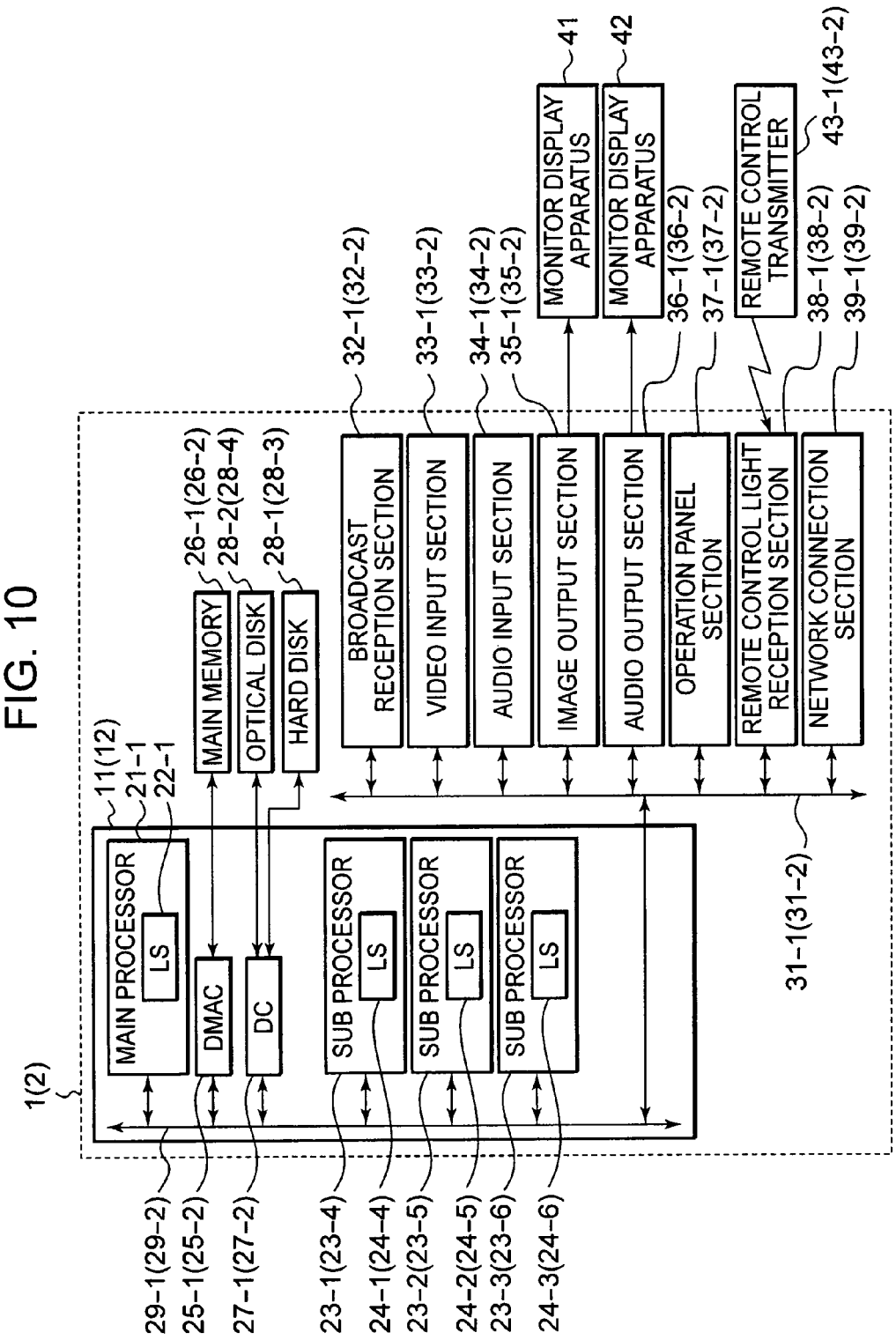
FIG. 10 is a diagram showing a hardware configuration of a hard disk recorder in FIG. 9.
Figure 11:
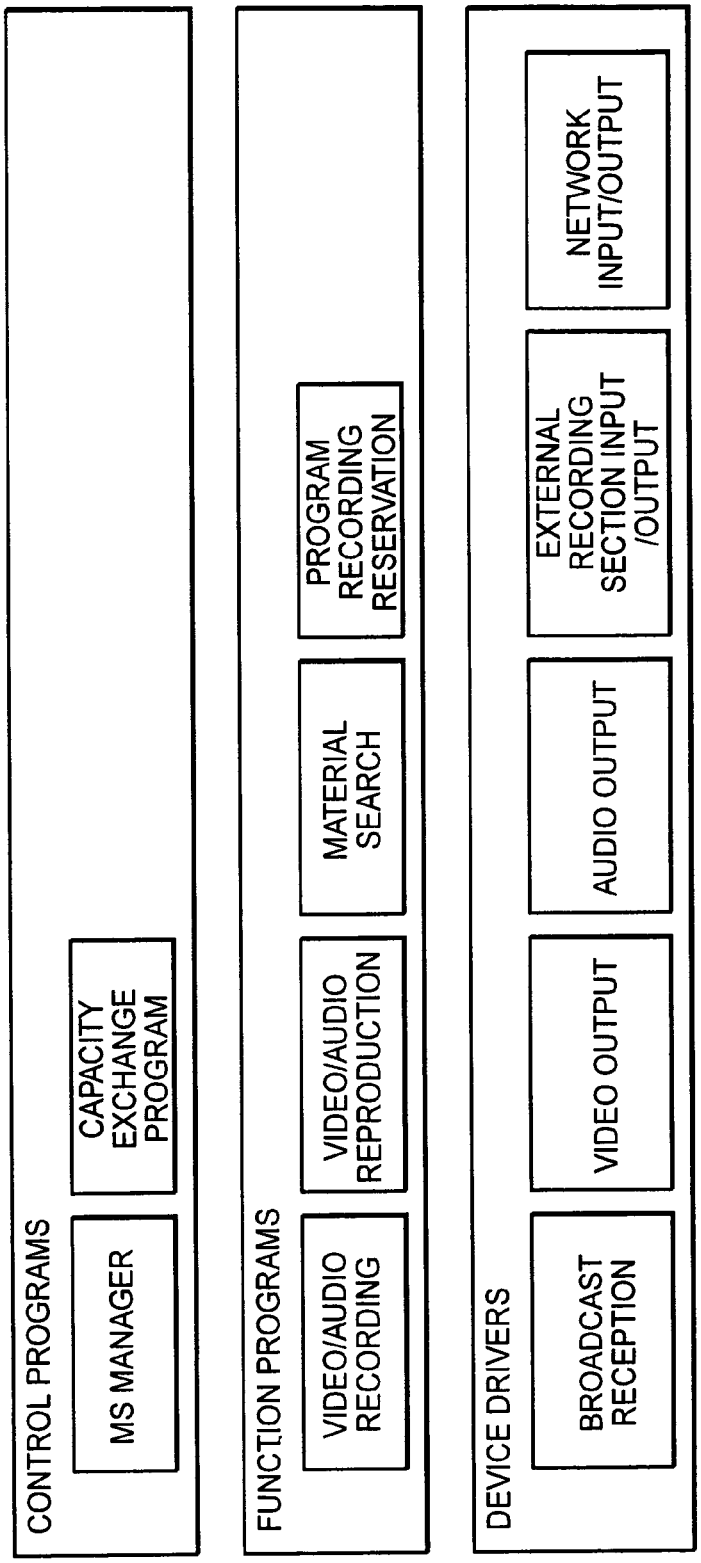
FIG. 11 is a diagram showing a software configuration of the hard disk recorder in FIG. 9.

One example of the information processing apparatus 1 that includes the information processing controller 11 is a hard disk recorder. FIGS. 10 and 11 show a hardware configuration and a software configuration of the hard disk recorder in the figure. As the hardware configuration of the hard disk recorder, it is configured such that a hard disk is incorporated therein as the external recording section 28-1 shown in FIG. 1 above, and an optical disk such as a DVD±R/RW, a CD±R/RW, a Blu-ray Disc (registered trademark) can be loaded therein as the external recording section 28-2 shown in FIG. 1 above. Further, a broadcast reception section 32-1, a video input section 33-1, an audio input section 34-1, a video output section 35-1, an audio output section 36-1, an operation panel section 37-1, a remote control light reception section 38-1, and a network connection section 39-1 are connected to a bus 31-1 that is connected to the bus 29-1 of the information processing controller 11.

The broadcast reception section 32-1, video input section 33-1, and audio input section 34-1 receive a broadcasting signal, or input a video signal and an audio signal from the outside of the information processing apparatus 1 for conversion into digital data of a predetermined format, and signal the digital data to the bus 31-1 for processing by the information processing controller 11. The video output section 35-1 and the audio output section 36-1 process video data and audio data signaled from the information processing controller 11 to the bus 31-1, and signal the video data and the audio data as they are or converted into analog signals, to the outside of the information processing apparatus 1. The remote control light reception section 38-1 receives a remote control infrared signal from a remote control transmitter 43-1.

As shown in FIGS. 9 and 10, a monitor display apparatus 41 and a speaker apparatus 42 are connected to the video output section 35-1 and the audio output section 36-1 of the information processing apparatus (hard disk recorder) 1.

Also the information processing apparatus 2 that includes the information processing controller 12 exemplified in FIG. 9 above is a hard disk recorder, and is configured similarly to the information processing apparatus 1 as shown in FIG. 10 in which reference numerals are applied in parentheses. However, as shown in FIG. 9, a monitor display apparatus and a speaker apparatus are not connected to the information processing apparatus (hard disk recorder) 2.

As their software configuration, the information processing apparatus (hard disk recorders) 1 and 2, i.e., the information processing controllers 11 and 12 include, as shown in FIG. 11, the MS manager and the capacity exchange program as the control programs. Further, they include programs for video/audio recording, video/audio reproduction, material search, and program for program recording reservation as the function programs. Furthermore, they include programs for broadcast reception, video output, audio output, external recording section input/output, and network input/output as the device drivers.

Figure 12:
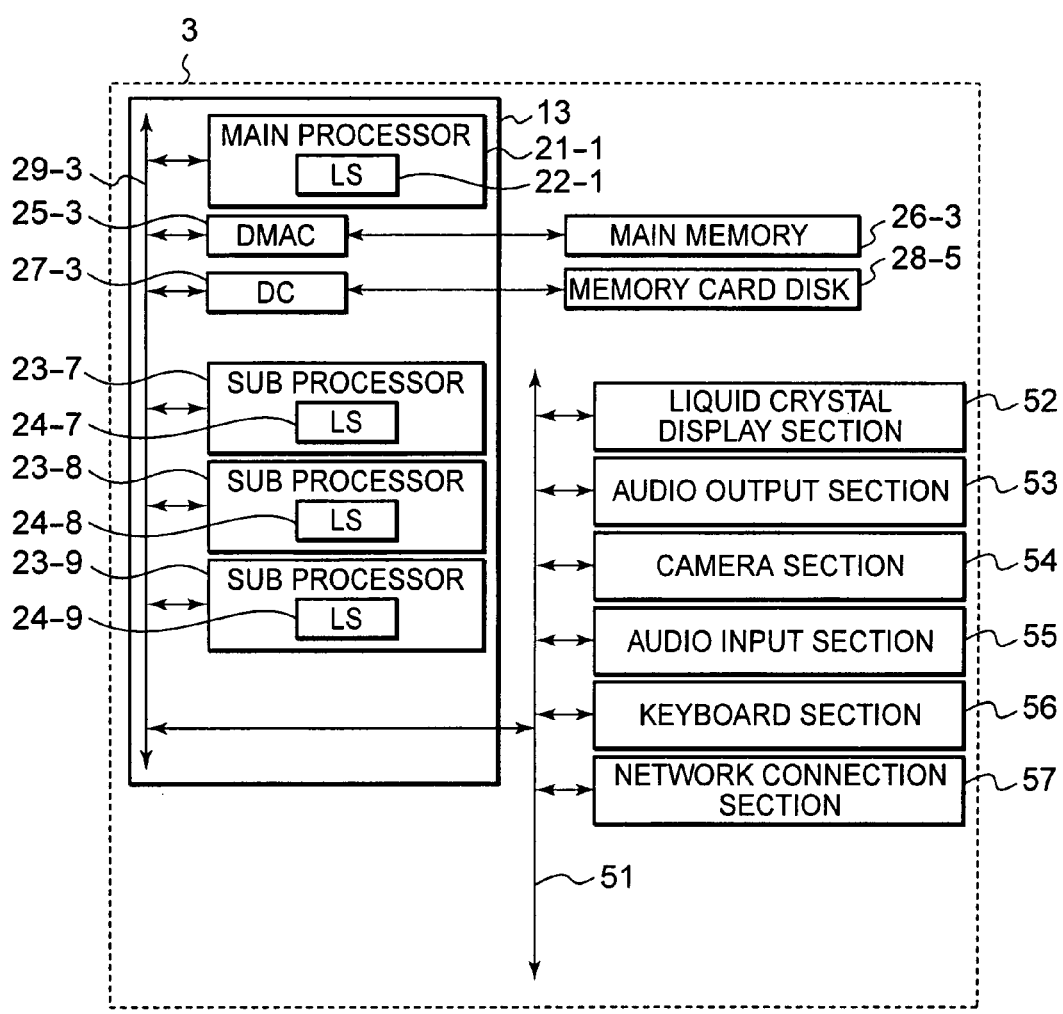
FIG. 12 is a diagram showing a hardware configuration of a PDA in FIG. 9.

Further, another example of the information processing apparatus 3 that includes the information processing controller 13 is a PDA (Personal Digital Assistants). FIG. 12 shows a hardware configuration of the information processing apparatus 3 configured as a PDA. In an example shown in the figure, it is configured such that a memory card disk 28-5 can be loaded therein as the external recording section shown in FIG. 1 above, and a liquid crystal display section 52, an audio output section 53, a camera section 54, an audio input section 55, a keyboard section 56, and a network connection section 57 are connected to a bus 51 that is connected to a bus 29-3 of the information processing controller 13.

Note that the information processing controller 13 whose internal configuration is not shown in FIG. 1 includes a main processor 21-3, sub processors 23-7, 23-8, 23-9, a DMAC (Direct Memory Access Controller) 25-3, a DC (Disk Controller) 27-3, and a bus 29-3. The main processor 21-3 has an LS (Local Storage) 22-3, and the sub processors 23-7, 23-8, 23-9 include LSs (Local Storages) 24-7, 24-8, 24-9.

Figure 13:
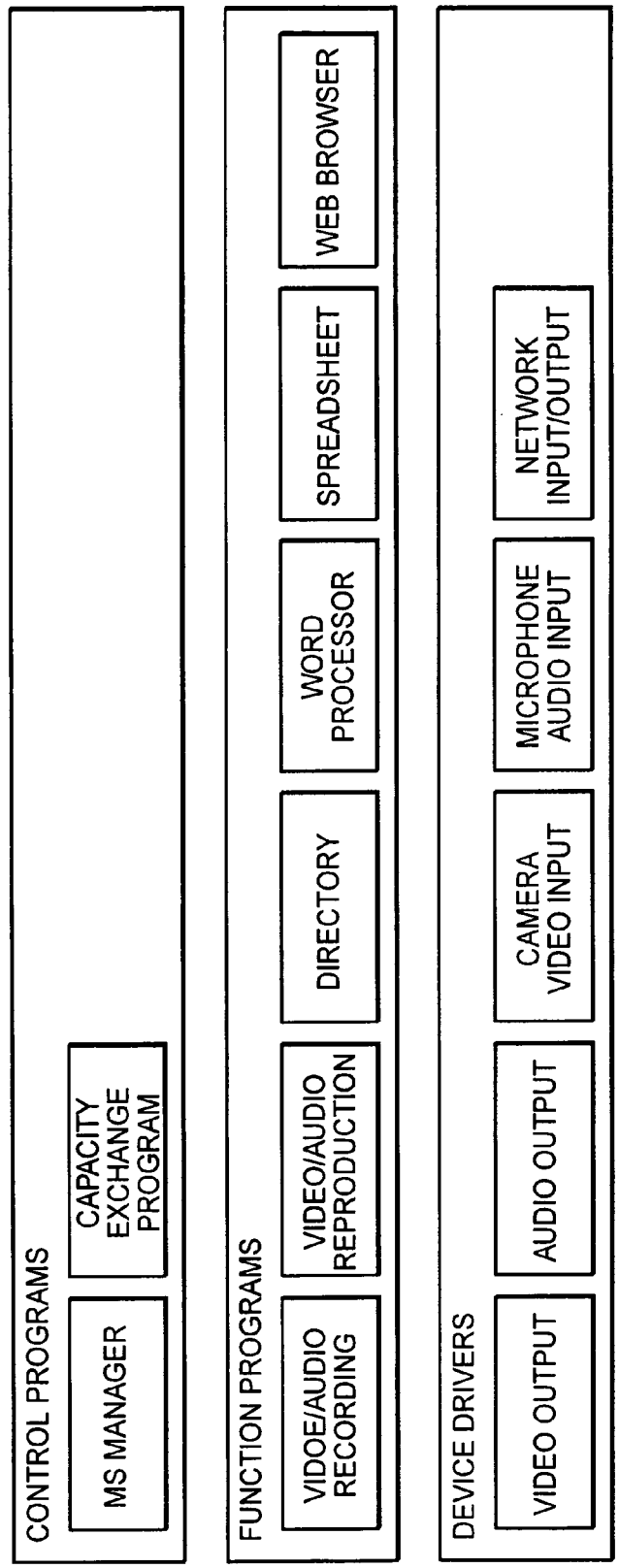
FIG. 13 is a diagram showing a software configuration of the PDA in FIG. 9.

Furthermore, FIG. 13 shows a software configuration of the information processing apparatus (PDA) 3, i.e., the information processing controller 13. As shown in the figure, the information processing controller 13 includes the MS manager and the capacity exchange program as the control programs. Further, it includes programs for video/audio recording, video/audio reproduction, telephone directory, word processor, spreadsheet, and a Web browser as the function programs. Furthermore, it includes programs for video output, audio output, camera video input, microphone audio input, and network input/output as the device drivers.

Figure 14:
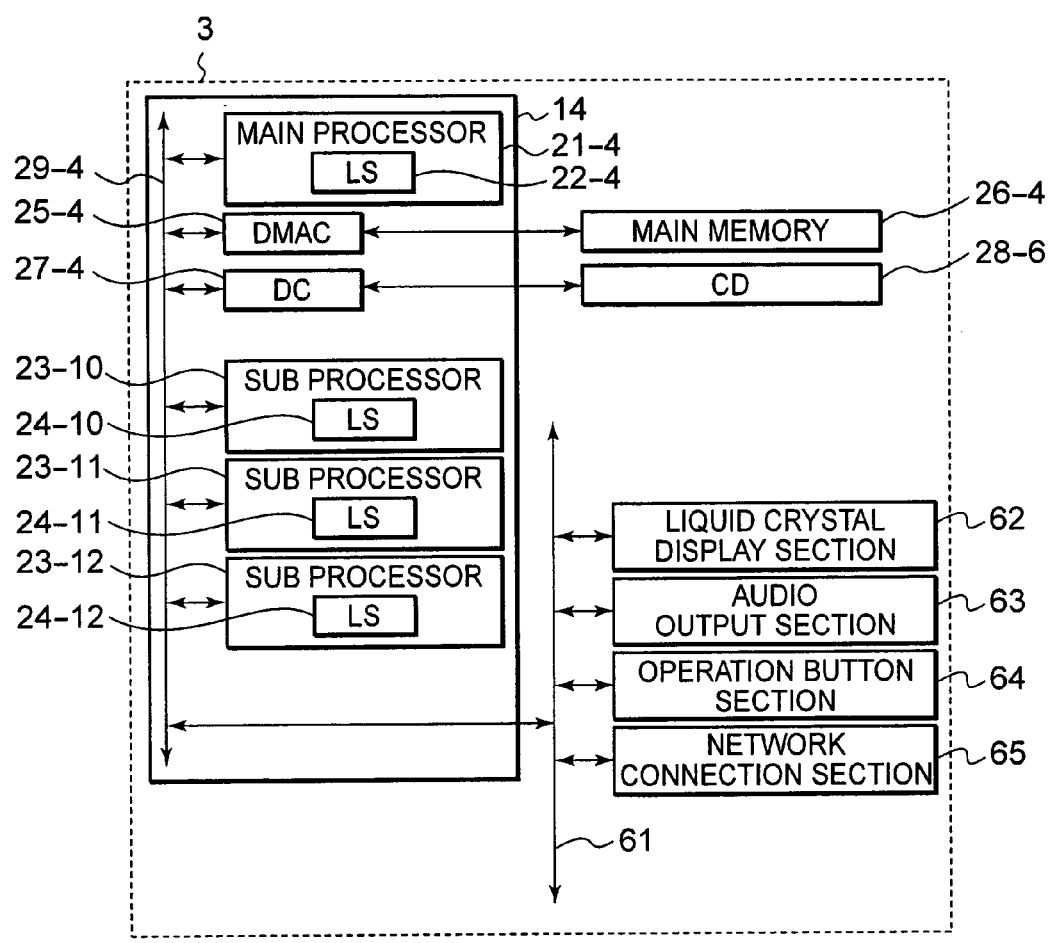
FIG. 14 is a diagram showing a hardware configuration of a portable CD player in FIG. 9.

Furthermore, the information processing apparatus 4 that includes the information processing controller 14 is a portable CD player. FIG. 14 shows a hardware configuration of the portable CD player. In an example shown in the figure, the portable CD player is configured such that a CD (Compact Disc) 28-6 can be loaded therein as an external recording section shown in FIG. 1 above, and a liquid crystal display section 62, an audio output section 63, an operation button section 64, and a network connection section 65 are connected to a bus 61 that is connected to a bus 29-4 of the information processing controller 14.

Note that the information processing controller 14 whose internal configuration is not shown in FIG. 1 includes a main processor 21-4, sub processors 23-10, 23-11, 23-12, a DMAC 25-4, a DC 27-4, and the bus 29-4. The main processor 21-4 has an LS 22-4, and the sub processors 23-10, 23-11, 23-12 have LSs 24-10, 24-11, 24-12.

Figure 15:
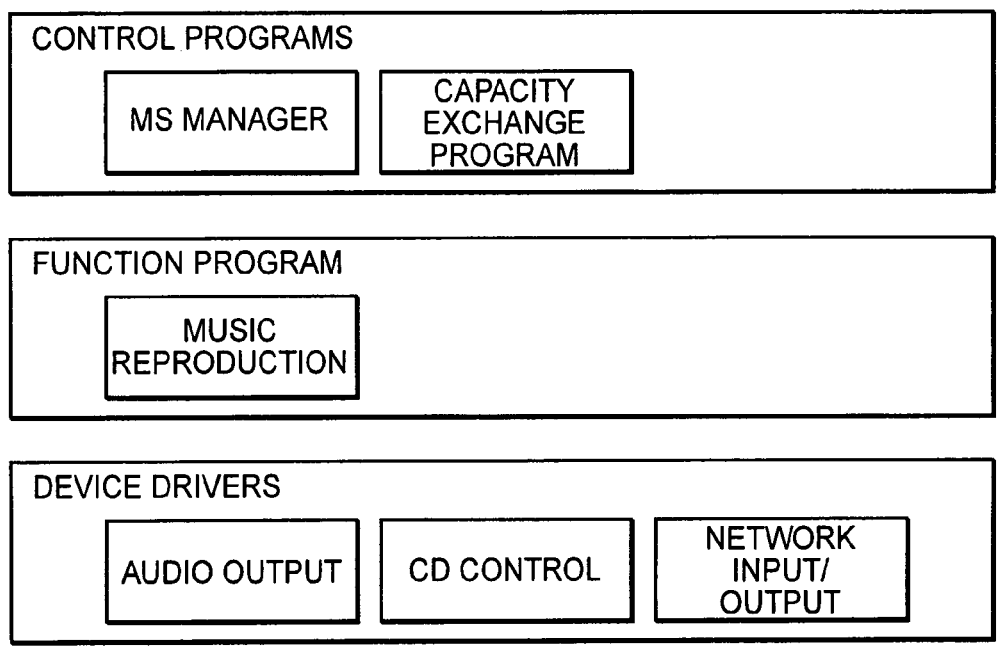
FIG. 15 is a diagram showing a software configuration of the portable CD player in FIG. 9.
Figure 18:
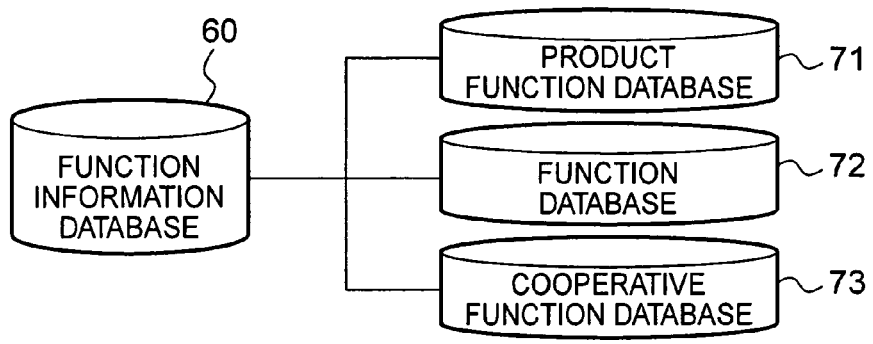
FIG. 18 is a diagram showing an example of a configuration of a function information database 60.

FIG. 15 shows a software configuration of the information processing apparatus (portable CD player) 4, i.e., the information processing controller 14. As shown in the figure, the information processing controller 14 includes the MS manager and the capacity exchange program as the control programs. Further, it includes a program for music reproduction as the function program, and programs for audio output, CD control, and network input/output as the device drivers.

In the network system exemplified in FIG. 9 above, it is assumed that the information processing apparatus 1, 3, and 4 are connected to the network 9, and the information processing apparatus 1 is set as the master apparatus (MS status=0) and the information processing apparatus 3 and 4 are set as slave apparatus (MS status=1).

When, in this state, the information processing apparatus 2 is newly connected to the network 9, the MS manager that is being executed in the main processor 21-2 included in the information processing controller 12 in the information processing apparatus 2 inquires the other information processing apparatus 1, 3, and 4 about the MS status, recognizes that the information processing apparatus 1 already exists as the master apparatus, and then sets the self apparatus (information processing apparatus 2) as a slave apparatus (MS status=1). Further, the information processing apparatus 1 set as the master apparatus gathers apparatus information about the respective apparatus including the newly added information processing apparatus 2, and updates the apparatus information tables in the main memory 26-1.

A case where the user operates, in this state, the information processing apparatus (PDA) 3, which is a slave apparatus, to make a program recording reservation for a two-hour broadcasting program will be described below.

In this case, the information processing apparatus 3 which is a slave apparatus accepts input of program recording reservation information including information, such as a recording start time, a recording end time, a recording object broadcast channel, and a recording picture quality, and produces a software cell including the program recording reservation information, and a program recording reservation command as the DMA command, for transmission to the information processing apparatus 1 which is the master apparatus.

The main processor 21-1 included in the information processing controller 11 in the information processing apparatus 1 having received the software cell whose DMA command is the program recording reservation command reads out the program recording reservation command, and also refers to the apparatus information tables in the main memory 26-1 to specify an information processing apparatus that can execute the program recording reservation command.

First, the main processor 21-1 reads out the information processing apparatus type IDs of the information processing apparatus 1, 2, 3, 4 included in the apparatus information tables to extract those information processing apparatus that can execute a function program corresponding to the program recording reservation command. Here, the information processing apparatus 1 and 2 having the information processing apparatus type ID indicating the recording function are specified as candidate apparatus, while the information processing apparatus 3 and 4 are excluded from candidate apparatus.

Next, the main processor 21-1 included in the information processing controller 11 in the information processing apparatus 1 which is the master apparatus refers to the apparatus information tables to read out information regarding the apparatus, such as the processing capacities of the main processors and sub processors and information regarding the main memories, of the information processing apparatus 1 and 2, and judges whether or not the information processing apparatus 1 and 2 satisfy the required specifications necessary for executing the function program corresponding to the program recording reservation command. It is assumed here that both of the information processing apparatus 1 and 2 satisfy the required specifications necessary for executing the function program corresponding to the program recording reservation command.

Further, the main processor 21-1 refers to the apparatus information tables to read out information regarding external recording sections of the information processing apparatus 1 and 2, and judges whether or not the free capacities of the external recording sections satisfy a capacity necessary for executing the program recording reservation command. Since the information processing apparatus 1 and 2 are hard disk recorders, differences between the total capacities and the utilization capacities of the external recording sections 28-1, 28-3 respectively correspond to the free capacities.

In this case, it is assumed that the free capacity of the external recording section 28-1 of the information processing apparatus 1 is 10 minutes in terms of a recording period of time, and the free capacity of the hard disk 28-3 of the information processing apparatus 2 is 20 hours in terms of the recording period of time.

In this instance, the main processor 21-1 included in the information processing controller 11 in the information processing apparatus 1 which is the master apparatus specifies the information processing apparatus that can secure a free capacity for two hours necessary for executing the program recording reservation command as an execution request destination slave apparatus.

As a result, only the information processing apparatus 2 is selected as the execution request destination slave apparatus, and the main processor 21-1 included in the information processing controller 11 in the information processing apparatus 1 which is the master apparatus transmits the program recording reservation command including the program recording reservation information transmitted from the information processing apparatus 3 operated by the user, to the information processing apparatus 2 to request the information processing apparatus 2 to reserve the above-mentioned two-hour broadcast program for recording.

And the main processor 21-2 included in the information processing controller 12 in the information processing apparatus 2 analyzes the program recording reservation command, loads a function program necessary for recording from the hard disk 28-3, which is an external recording section, into the main memory 26-2, and executes the recording in accordance with the program recording reservation information. As a result, video/audio data of the two-hour broadcast program reserved for recording are recorded on the hard disk 28-3 of the information processing apparatus 2.

In this manner, also in the network system in the example of FIG. 9, the user can cause the plural information processing apparatus 1, 2, 3, 4 to operate as the virtual single information processing apparatus 7 by operating only one of the information processing apparatus without operating any other one of the information processing apparatus.

B. Implementation of Expanded Functions in Virtual Single Information Processing Apparatus As described above, according to the present invention, when a plurality of networked information processing apparatus cooperate with each other, a single virtual information processing apparatus can be implemented. As another embodiment of the present invention, a virtual information processing apparatus configured as a summation of respective information processing apparatus can have a section for acquiring performance information necessary for executing functions. According to the section for acquiring performance information about a system, excess processing capacities in the virtual single information processing apparatus can easily be grasped, and also expanded functions that become executable through cooperation of a plurality of information processing apparatus can easily and efficiently be used, whereby user convenience can be enhanced.

FIG. 16 schematically shows a configuration of a network system according to an embodiment of the present invention. The network system shown in the figure constructs a virtual information processing apparatus 20 by causing a plurality of information processing apparatus 10, 11 . . . , which are interconnected by a local area network, such as a home network, to cooperate with each other.

Of the information processing apparatus 10, 11 . . . , one apparatus operates as a master apparatus, and the rest operate as slave apparatus (described hereinabove).

The virtual information processing apparatus 20 includes a section for acquiring performance information necessary for executing functions in the system configured as a summation of the respective information processing apparatus. Specifically, information processing apparatus operating as the master apparatus mainly implements this section.

The virtual information processing apparatus 20 can be connected to a server 50 via a communication network 40 such as the Internet. While the server 50 can make various information open, in the present invention, a function information database 60 and a software database 61 are particularly provided.

The virtual information processing apparatus 20 can acquire target data, software, and the like from the server 50. The virtual information processing apparatus 20 can present to the user, on the basis of information acquired from the server 50, a list of currently usable functions, a list of functions to be usable if a new information processing apparatus is connected, and the like, as appropriate. If the contents of the databases are updated to the latest in real-time or at a predetermined timing, user convenience is further enhanced.

However, the presence of databases and a server of these types is not an essential requirement for implementing the present invention. For example, it may be configured such that databases used for searching/extracting information processing apparatus information are provided in the virtual information processing apparatus 20, or are provided to the virtual information processing apparatus 20 in other forms.

A hardware configuration of each of the information processing apparatus 10, 11 . . . is as shown in FIGS. 1, 10, 12, 14, and the like. That is, each of the individual actual information processing apparatus 10, 11 . . . includes one main processor, one or more sub processors, a DMAC (Direct Memory Access Controller), a DC (Disk Controller), a main memory formed from a DRAM or the like, external recording section, and the like.

When each of the information processing apparatus 10, 11 cooperates with the other information processing apparatus interconnected via a local network 30, and then starts the MS manager and capacity exchange program (described hereinabove), it can construct the virtual information processing apparatus 20. During this process of constructing the virtual information processing apparatus 20, each of the information processing apparatus 10, 11 . . . can acquire its own apparatus information.

FIG. 17 shows an example of apparatus information.

An information processing apparatus ID is an identifier for identifying an information processing apparatus that includes an information processing controller, and represents the ID of an information processing apparatus that transmits a status return command.

An information processing apparatus type ID includes a value representative of a characteristic of the information processing apparatus. The characteristic of the information processing apparatus is, e.g., a hard disk recorder, a PDA, a portable CD player, or the like. The information processing apparatus type ID may be of a type representing a function which the information processing apparatus has, such as video/audio recording or video/audio reproduction. The value representative of a characteristic or a function of an information processing apparatus is determined in advance. When the information processing apparatus type ID is read out, a characteristic or a function of the information processing apparatus can be grasped.

An MS status represents which one of a master apparatus and a slave apparatus the information processing apparatus is operating as. Where it is set to 0, it indicates that the information processing apparatus is operating as a master apparatus, and where it is set to 1, it indicates that the information processing apparatus is operating as a slave apparatus.

A main processor operation frequency represents an operation frequency of the main processor in the information processing controller. A main processor utilization factor represents a utilization factor in the main processor regarding all of programs currently operating in the main processor. A main processor utilization factor is a value representing the ratio of the processing capacity being currently used to the total processing capacity of the object main processor and is calculated, e.g., in a unit of MIPS, which is a unit for evaluating the processor processing capacity, or on the basis of a processor utilization time per unit time. This similarly applies also to a sub processor utilization factor hereinafter described.

The number of sub processors represents the number of sub processors included in the information processing controller. A sub processor ID represents an identifier for identifying each of the sub processors in the information processing controller.

A sub processor status represents a status of each of the sub processors and may be one of an unused status, a reserved status, a busy status, and the like. The unused status indicates that the sub processor is neither currently used nor is reserved for use. The reserved status indicates that the sub processor is not used but is reserved for use. The busy status indicates that the sub processor is currently used.

A sub processor utilization factor represents a utilization factor in the sub processor regarding a program being executed by the sub processor or being reserved for execution in the sub processor. That is, the sub processor utilization factor indicates a current utilization factor where the sub processor status is "busy", and indicates an estimated utilization factor with which the sub processor is planned to be used later where the sub processor status is "reserved".

A set of the sub processor ID, sub processor status, and sub processor utilization factor is set for one sub processor, and thus, as many sets as the number of sub processors in one information processing controller are set.

A main memory total capacity and a main memory utilization capacity represent a total capacity and a capacity being currently used of the main memory connected to the information processing controller, respectively.

The number of external recording sections represents the number of external recording sections 28 connected to the information processing controller. An external recording section ID is information for uniquely identifying each of the external recording sections 28 connected to the information processing controller. An external recording section type ID represents a type of the external recording section 28 (e.g., a hard disk, a CD±RW, a DVD±RW, a memory disk, an SRAM, a ROM, or the like).

An external recording section total capacity and an external recording section utilization capacity represent a total capacity and a capacity currently used of an external recording section identified by the external recording section ID, respectively.

A set of the external recording section ID, external recording section type ID, external recording section total capacity, and external recording section utilization capacity is set for one external recording section, and thus, as many sets as the number of external recording sections connected to the information processing controller are set. That is, where a plurality of external recording sections are connected to an information processing controller, different external recording section IDs are applied respectively to the external recording sections, and also the external recording section type IDs, external recording section total capacities, and external recording section utilization capacities are managed separately from each other.

Such apparatus information can be requested by issuing a status request command, which is one of DMA commands. That is, an information processing apparatus having received the status request command returns, in response thereto, the status return command in which the apparatus information shown in the figure is stored in a data area.

The information processing apparatus operating as a master apparatus acquires apparatus information from information processing apparatus operating in cooperation and collaboration therewith on the network, and integrates these resources and processing capacities to calculate excess processing capacities as the virtual information processing apparatus 20.

Further, the information processing apparatus operating as a master apparatus can acquire data regarding information processing apparatus performance and functions (function expansion), cooperative function execution software, and the like, from the server 50 via the communication network 40. Furthermore, this master apparatus stores or installs the data and the software acquired from the server 50 in the main memory on the self apparatus or an external storage apparatus.

Furthermore, when any of the functions is executed on any of the information processing apparatus 10, 11 . . . that form the virtual information processing apparatus 20, a function use history is produced on the master apparatus, and is stored in the external storage apparatus to construct a function use history database. Table 1 indicated below shows an example of a configuration of the function use history database in the virtual information processing apparatus 20. In the table, it is described that the user performed, on Jan. 20, 2004, high resolution processing under a situation wherein a user apparatus was connected to an information processing apparatus having an information processing apparatus ID "Z0011", performed, on Jan. 23, 2004, multi-channel recording processing through program recording reservation operation in cooperation with information processing apparatus respectively having information processing apparatus IDs "Z0020" and "Z0021", and the like.

TABLE 1

| User ID | Used date/time | Function ID | Function name | Connected apparatus IDs | |
|---|---|---|---|---|---|
| XY001 | 2004/01/20 | B0010 | Resolution increasing processing | Z0011 | — |
| XY001 | 2004/01/23 | A0010 | Multi-channel recording | Z0020 | Z0021 |

The server 50 has the function information database 60 and the software database 70. The function information database 60 stores therein data regarding information processing apparatus performance and functions as to the individual information processing apparatus that can be incorporated into the virtual information processing apparatus 20, or data regarding information processing apparatus performance and functions to be implemented as a combination of a plurality of information processing apparatus. Further, the software database 70 stores therein software necessary for executing cooperative functions of a plurality of information processing apparatus.

The server 50 provides necessary data and software to information processing apparatus, upon request from an information processing apparatus operating as a master apparatus in the virtual information processing apparatus 20 or at a timing set to the server 50.

The function information database 60 includes, e.g., an information processing apparatus function database 71, a function database 72, and a cooperative function database 73. The information processing apparatus function database 71 stores therein information indicating what performance each information processing apparatus has and which function is executable. Further, the function database 72 stores therein information indicating performance required for executing each of the functions. Furthermore, the cooperative function database 73 stores therein information indicating functions that become newly executable through cooperation of information processing apparatus. Examples of these databases 71 to 73 are shown in Tables 2 to 4 below, respectively.

processor utilization capacity, main memory utilization capacity, sub processor utilization capacities, external storage utilization capacities, and a description of the function is described for each function entry.

TABLE 2

| Product ID | Product name | CPU operation frequency | Main Processor total capacity | Total number of sub processors | External storage capacity | Executable function IDs | | | |
|---|---|---|---|---|---|---|---|---|---|
| | | | | | | 010 | 010 | 010 | 010 |
| Z0010 | Information Processing Apparatus 10 | 1G | 512M | 6 | 150G | | | | |
| Z0011 | Information Processing Apparatus 11 | 2G | 1G | 12 | 300G | | | | |
| Z0012 | Information Processing Apparatus 12 | 1.5G | 256M | 4 | 10G | | | | |

TABLE 3

| Function ID | Function name | Main CPU utilization capacity | ain memory total capacity | Sub processor utilization capacity | External storage utilization capacity | Description of functions |
|---|---|---|---|---|---|---|
| A0010 | Multi-channel recording | 256M | 56M | 6 | 60G | Images of multi-channel broadcast programs can be recorded. |
| B0010 | Resolution increasing processing | 512M | 68M | 8 | 40G | Higher-quality picture than during normal reproduction can be provided by performing high resolution processing on reproduced picture. |
| C0010 | Noise removing processing | 128M | 4M | 2 | 10G | Noise appearing on video such as block noise and mosquito noise is removed. |

TABLE 4

| Product ID | Product name | Function ID | Function name |
|---|---|---|---|
| Z0011 | Information processing apparatus 11 | B0010 | Resolution increasing processing |
| Z0012 | Information processing apparatus 12 | C0010 | Noise removing processing |

First, in the example of the information processing apparatus function database 71, information regarding executable functions is stored for each information processing apparatus (i.e., information processing apparatus forming the virtual information processing apparatus). Specifically, information such as the main processor operating frequency, main memory total capacity, the total number of sub processors, IDs of function programs independently executable by each information processing apparatus, and the like is described for each information processing apparatus entry.

Further, in the example of the function database 72, information regarding an apparatus configuration and excess processing capacities required for the virtual information processing apparatus to implement each of the functions is stored. Specifically, information such as the required main The virtual information processing apparatus can implement cooperative functions, i.e., expanded functions corresponding to combinations of cooperating information processing apparatus. The cooperative function database 73 stores therein information regarding new cooperative functions that become able to be implemented by, e.g., combinations of the information processing apparatus 10 serving as a master apparatus with the other information processing apparatus 11, 12 . . . . Specifically, information such as the information processing apparatus ID, information processing apparatus name, function program ID, function name is described for each information processing apparatus entry.

The network system according to the present invention can grasp excess processing capacities in a virtual information processing apparatus constructed through cooperative/collaborative operation of a plurality of information processing apparatus, and also provide services for providing performance information necessary for executing functions.

For example, let it be assumed that a user makes a request for executing the latest function or an expanded function when performing an operation on any of information processing apparatus forming a virtual information processing apparatus. In such a case, the virtual information processing apparatus can grasp excess processing capacities, and determine whether or not the virtual information processing apparatus is provided with excess capacities necessary for executing the function. Further, if the virtual information processing apparatus is not provided with a sufficient apparatus configuration, the virtual information processing apparatus can provide performance information necessary for executing the function. The user, e.g., adds a new information processing apparatus or peripheral equipment to the network on the basis of the performance information provided, whereby the user can easily implement function expansion of the virtual information processing apparatus.

How such a virtual information processing apparatus is operated will be described in detail below.

(1) The information processing apparatus 10 is operating as a master apparatus. And it acquires apparatus information from another information processing apparatus 11 interconnected via the local network 30 (e.g., home network) and cooperating as a slave apparatus, through a network controller and control programs, and calculates a summation of excess processing capacities as the virtual information processing apparatus 20.

(2) Further, the information processing apparatus 10 acquires the information processing apparatus function database 71, function database 72, cooperative function database 73 from the server 50 at a predetermined timing (e.g., after a user-set period of time has elapsed, a time triggered by updating of information with the information processing apparatus 10 being requested on the side of the server 50, or the like). Furthermore, when a cooperative function is implemented through its combination with another information processing apparatus, and new software is required for its execution, the information processing apparatus 10 acquires cooperative software from the software database 61 in advance. As a result, a waiting time for downloading software when the user tries to use the cooperative function can be reduced.

Note that in downloading software, its necessity is determined taking into account conditions such as user permission, a remaining storage capacity of the information processing apparatus.

(3) The virtual information processing apparatus 20 creates a list of functions executable at the present instance by the virtual information processing apparatus 20 using excess processing capacity values, the information processing apparatus function database 71, the function database 72, the cooperative function database 73, and displays necessary information to the user as appropriate. For this display processing, a monitor display of, e.g., any of the information processing apparatus 10, 11 forming the virtual information processing apparatus 20 can be used.

In this instance, how functions are displayed may be varied in accordance with a GUI (Graphical User Interface), and thus a form, such as an icon, a message box, or a list selection, does not matter. Let the cooperative function database 73 shown in Table 3 above be taken as an example. When the virtual information processing apparatus 20 is formed solely from the information processing apparatus 10, only a multi-channel recording function is enabled. However, if the information processing apparatus 10 cooperates with the information processing apparatus 11, the high resolution processing becomes enabled. Thus, an entry of high resolution processing is added to the executable function list. Further, by referring to the function database 72 for the function, a description of the function can be displayed.

(4) When the user tries to execute a certain function or reserve it on the virtual information processing apparatus 20, if there is any of functions held by the virtual information processing apparatus which is inexecutable due to insufficient processing capacities, the virtual information processing apparatus 20 checks to see how many information processing apparatus having what performance in what capacity should be connected to make the function usable (information regarding information processing apparatus additionally required to cooperate), on the basis of the information processing apparatus function database 71, function database 72, and displays information explicitly indicating information processing apparatus required for addition/expansion (e.g., information processing apparatus name, model number, and the like).

For example, when the virtual information processing apparatus 20 tries to perform the high resolution processing, if the number of sub processors necessary for the high resolution processing is insufficient due to different processing being already performed on the virtual information processing apparatus, the virtual information processing apparatus 20 extracts an information processing apparatus having the number of sub processors necessary on the information processing apparatus from the information processing apparatus function database 71. And if the information processing apparatus 12 meets the requirement, the virtual information processing apparatus presents this information processing apparatus information to the user, to indicate that the desired high resolution processing could possibly be executed if the user connects this apparatus 12 to the local network 30 for incorporation into the virtual information processing apparatus 20.

(5) Furthermore, apart from the above, assuming that an information processing apparatus of a type different from that of the information processing apparatus connected to the same network is connected, and where a cooperative function newly usable by such a combination exists, information explicitly indicating the information processing apparatus (e.g., information processing apparatus name, model number, and the like) and the function to be implemented through cooperation with the information processing apparatus is displayed on the basis of the cooperative function database 72.

For example, where the virtual information processing apparatus 20 formed through cooperation of the information processing apparatus 10 with the information processing apparatus 11 is already cooperating, and a noise removing filter may not be executed under the current configuration, let it be assumed that the noise removing filter can be operated if the information processing apparatus 12 is further connected (e.g., implements cooperation). In such a case, the virtual information processing apparatus 20 displays the name of the function that becomes newly operable, the specific information processing apparatus name, model number of an information terminal necessary for the execution, and the like.

(6) The information processing apparatus 10 or the virtual information processing apparatus 20 stores them into the external storage apparatus in the information processing apparatus as a function use history such as shown in Table 1, when the function has actually been executed. And when the above-mentioned newly added function and information processing apparatus information are to be displayed, the following information that is considered more beneficial to the user is provided on the basis of the function use history/information terminal connection history created in the information processing apparatus.

1. Information relating to information processing apparatus connected in the past 2. Information processing apparatus that can perform the function most suitable for an operation which the user is to perform, where no information processing apparatus that can make an additional function executable is found in the use history.

Figure 19:
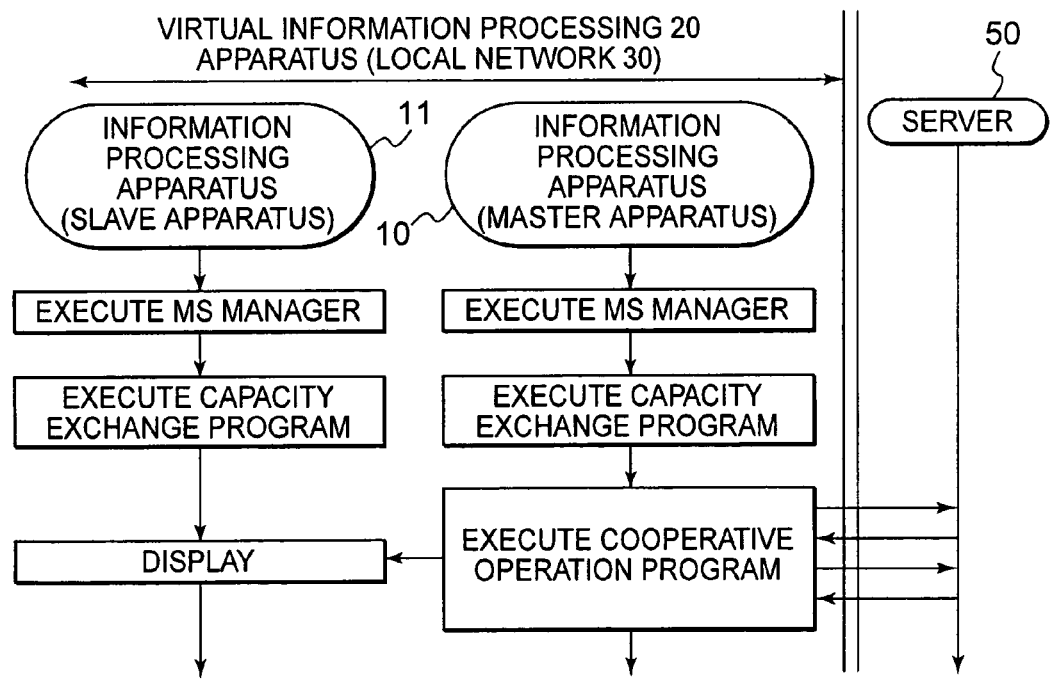
FIG. 19 is a sequence diagram showing an operation procedure for grasping, through cooperative operation between a virtual information processing apparatus 20 and a server 50 on a network, excess processing capacities in the virtual information processing apparatus, and for providing performance information necessary for executing functions.

FIG. 19 diagrammatically illustrates an operation procedure for grasping excess processing capacities in the virtual information processing apparatus and for providing performance information necessary for executing functions through cooperative operation between the virtual information processing apparatus 20 and the server 50 on the network. However, it is assumed that the virtual information processing apparatus 20 is implemented through cooperative operation of the two information processing apparatus 10 and 11 interconnected on the local network 30, and that the information processing apparatus 10 is operating as a master apparatus and the information processing apparatus 11 is operating as a slave apparatus. Further, the virtual information processing apparatus 20 and the server 50 are connected via the communication network 40 such as the Internet.

As shown in Tables 2, 3, and 4 above, the server 50 manages information as to which one of the information processing apparatus has what performance and can execute which function, information indicating performance necessary for executing each of functions, and information indicating functions that become newly executable through cooperation of each of the information processing apparatus.

The master apparatus gathers apparatus information of all of cooperating information processing apparatus via the local network 30 by executing the capacity exchange program (described hereinabove). The apparatus information is assumed to include monitor flags (=0 for no monitor function available; =1 for a small monitor function available; and =2 for a large monitor function available). Further, in the present embodiment, the master apparatus gathers apparatus information about information processing apparatus (slave apparatus) forming the virtual information processing apparatus by executing the capacity exchange program to obtain the summation, and stores it as a processing capacity of the virtual information processing apparatus 20. The total number of sub processors of the information processing apparatus cooperating on the local network 30 as a whole is 32, for example.

In the present embodiment, the master apparatus installs a cooperative operation program and executes this program in order to grasp excess processing capacities in the virtual information processing apparatus and acquire performance information necessary for executing a function. This cooperative operation program is a computer program described so as to perform processing for promoting cooperative operation of a plurality of apparatus, and belongs to the category of control programs. Since it is only the master apparatus that requires to execute the cooperative operation program, only an apparatus that has become the master apparatus by executing the MS manager may load it from an external recording section.

The cooperative operation program transmits the information processing apparatus IDs and information processing apparatus type IDs of all of the information processing apparatus operating (i.e., forming the virtual information processing apparatus 20) on the local network 30.

In contrast, the server 50 calculates a processing capacity of the virtual information processing apparatus on the basis of all of the received information processing apparatus IDs and information processing apparatus type IDs, and extracts a list of functions usable on the basis of its excess processing capacities. And the server 50 refers to the cooperative function database 73 to extract, as to each of the information processing apparatus, functions newly executable through its cooperation with other information processing apparatus, and collects them to create an expandability table, and transmits the created expandability table to the master apparatus.

Table 5 shows an example of a configuration of the expandability table. In the example shown in the table, entries as expandable functions include the multi-channel recording, the high resolution processing, special channel reception, and each entry includes a description of information regarding hardware to be added to execute the corresponding expanded function, and other specifications.

TABLE 5

Expandability table
for information processing apparatus IDs: 0–999,
information processing apparatus type ID: 10 (=wide TV)

| Expandable functions for above apparatus | Additional specifications required therefor | | | |
|---|---|---|---|---|
| | Main memory | Number of sub processors | External storage section utilization capacity | Others |
| Multi-channel recording | Utilization capacity +256 M byte | +6 processors | +60 Gbyte | Function program for multi-channel recording (ID = 010) |
| Resolution increasing processing | +768 M byte | +8 processors | +40 Gbyte | Function program for increasing resolution (ID = 050) Sub processor program for increasing resolution (ID = 055) |
| Special channel reception | +512 M byte | +12 processors | +80 Gbyte | Function program for special channel reception (ID = 080) Information processing apparatus ID: 5000–5499 Information processing apparatus type ID: 50 (=special tuner) |

The master apparatus compares the received expandability table with the summation of apparatus information stored, extracts, from the expandability table, any function that becomes usable on the basis of the excess capacities of the virtual information processing apparatus formed from the information processing apparatus connected to the current local network 30, and displays this as an expandable function list on a monitor. For example, in the example shown in FIG. 19, expandable functions are outputted for display using the monitoring function of a slave apparatus, but the monitoring function of the master apparatus can, of course, be used.

The expandable functions may not necessarily be displayed in the form of a list, but may be in the form of a dialogue such as an inquiry that "Function XX is executable. Do you wish to execute?" or a notice that "Executable, so executed". In order to determine whether a function is executable or not, there may be a case where "an apparatus whose apparatus ID is Z0012 (=special tuner) may be included in the network", for example. Further, where some function program, sub processor program are necessary to execute an expanded function, it may be configured to acquire these programs from the software database 61 by transmitting their program IDs to the server 50.

Further, the master apparatus notifies the server 50 of an expanded function that is determined inexecutable due to insufficiency of the excess processing capacities in the virtual information processing apparatus formed from the information processing apparatus connected to the current local network 30 as a result of the comparison of the expandability table with the summation of the apparatus information of the virtual information processing apparatus. The server 50, which manages information indicating performance required for executing each function in its function database 72, extracts therefrom an information processing apparatus ID and an information processing apparatus type ID that are appropriate in order to make the expanded function executable, and returns this to the master apparatus.

And the master apparatus displays information regarding information processing apparatus required to be added in order to make the expanded function executable, which is transmitted from the server 50.

When the information regarding the expanded function is to be displayed, e.g., the following rules may be applied to provide more beneficial information for the user.

(1) Assuming that an information processing apparatus of a type different from that of information processing apparatus connected to the same network is connected, where a cooperative function newly usable by such a combination exists, information explicitly indicating the information processing apparatus (e.g., information processing apparatus name, model number, and the like) is displayed.

(2) When the information explicitly indicating the information processing apparatus (information processing apparatus name, model number, and the like) is to be displayed, an information processing apparatus that has been connected in the past is displayed with priority, on the basis of the function use history/information terminal connection history created in the information processing apparatus.

For example, an information processing apparatus necessary for the expanded function may be displayed in the form of a dialogue such as "If an information processing apparatus XX is connected, an expanded function YY can be executed". Further, when the user responded positively to this dialogue, there may be provided a link to a site for introducing the apparatus XX as a product or suggesting that the user purchase the apparatus XX.

Figure 20:
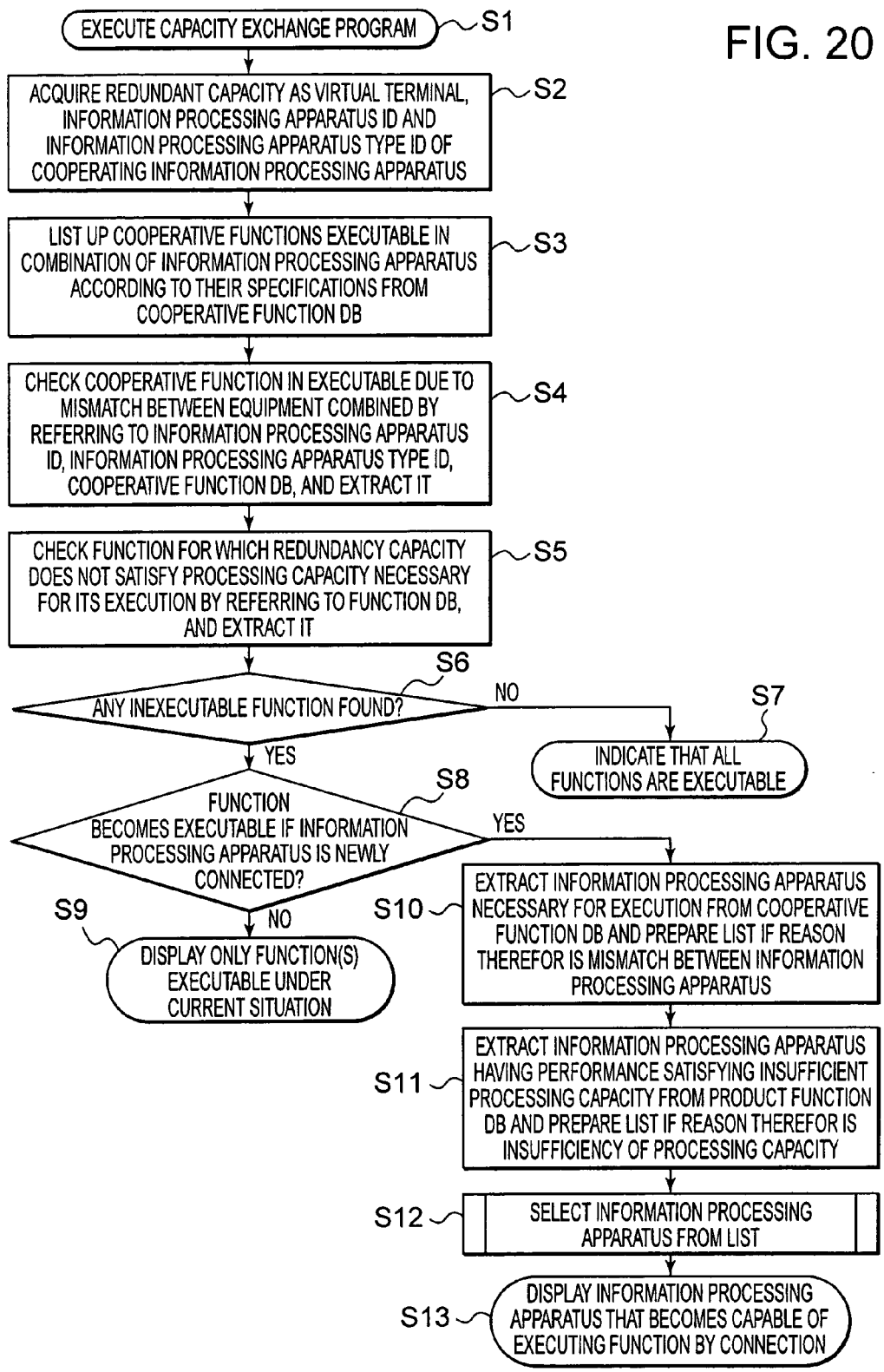
FIG. 20 is a flowchart showing a processing procedure extending from executing a capacity exchange program to providing a user with information processing apparatus information necessary for implementing an expanded function through cooperative operation of a plurality of information processing apparatus.

FIG. 20 shows a processing procedure to be followed when the virtual information processing apparatus 20 performs operation extending from executing the capacity exchange program to providing the user with information processing apparatus information necessary for implementing an expanded function through cooperative operation of a plurality of information processing apparatus.

First, the master apparatus executes the capacity exchange program in step S1 to gather apparatus information of information processing apparatus on the local network 30. And it acquires parameters such as excess processing capacities as the virtual information processing apparatus 20, information processing apparatus IDs and information processing apparatus type IDs of cooperating information processing apparatus in step S2. The excess processing capacities herein used are represented by the total number of excess sub processors, usable external storage section capacities, and the like. The master apparatus transmits the acquired information processing apparatus IDs and information processing apparatus type IDs of the information processing apparatus to the server 50.

Further, the server 50 lists up cooperative functions executable as the virtual information processing apparatus 20, i.e., creates an expandability table by referring to a cooperative function database 73 such as shown in, e.g., Table 4 above, on the basis of the information processing apparatus IDs and information processing apparatus type IDs received of the information processing apparatus on the local network 30, for transmission to the master apparatus. The master apparatus acquires this in step S3.

For example, in the example shown in Table 4 above, the virtual information processing apparatus 20 sees that the high resolution processing is executable when it cooperates with an apparatus whose information processing apparatus ID is Z0011, and that the noise removing processing is executable when it cooperates with an apparatus whose information processing apparatus ID is Z0012.

Furthermore, the server 50 compares an apparatus configuration as the virtual information processing apparatus, i.e., the information processing apparatus IDs and information processing apparatus type IDs acquired in the preceding step S2 with the cooperative function database 71 shown in Table 4 above to extract cooperative functions inexecutable due to mismatched combinations of information processing apparatus from the expandability table, for transmission to the master apparatus. The master apparatus acquires the result in step S4.

For example, where an apparatus whose information processing apparatus ID is Z0012 does not exist among the information processing apparatus forming a virtual information processing apparatus, the virtual information processing apparatus may not perform the noise removing filter, and thus the noise removing filter is listed up as an inexecutable cooperative function.

Furthermore, the master apparatus compares the excess processing capacities acquired in the preceding step S2 with the function database shown in Table 3 above, or an item which is a minimum processing capacity required for executing the functions listed in the expandability table shown in Table 5, to extract functions inexecutable due to insufficiency of processing capacities in step S5.

For example, an apparatus whose information processing apparatus ID is Z0011 exists among the information processing apparatus forming a virtual information processing apparatus, and thus there is a possibility that the high resolution processing can be executed, but where, e.g., the number of sub processors called for as a excess processing capacity is not satisfied due to the apparatus performing other parallel processing, the high resolution processing is listed up as a function inexecutable due to insufficient processing capacity.

After having performed the above processing, the master apparatus checks if an executable function exists in the expandability table presented in the preceding step S3 in step S6. And if all of functions determined enabled in terms of specifications are executable, the master apparatus presents to the user the fact that all of the expanded functions listed up in the expandability table presented in the preceding step S3 are executable, in some form or another in step S7.

On the other hand, where an inexecutable function exists in the expandability table in step S6, the master apparatus further checks if the currently inexecutable function becomes executable if some information processing apparatus is newly connected to the network in step S8.

For example, where additionally connected equipment does not contribute to implementing a function, due to, e.g., the excess processing capacity of the main memory of the master apparatus is short of a requisite capacity, the master apparatus presents to the user the fact that there is a function currently inexecutable, the reason why the function is inexecutable, and the like, in some form or another in step S9.

On the other hand, where it is determined in the determination process in step S8 that the expanded function currently inexecutable becomes executable by newly connecting some information processing apparatus to the network, if the function is inexecutable due to the absence of a cooperatable information processing apparatus, the master apparatus makes reference to the cooperative function database 73 shown in Table 4 above or the expandability table shown in Table 5 using any of cooperative functions inexecutable due to mismatched combinations of information processing apparatus obtained in the preceding step S3 as a key, to extract information regarding which information processing apparatus is required (step S10). The reference to the cooperative function database 72 is made via, e.g., the server 50.

In the example shown earlier, the noise removing processing is inexecutable, and in order to execute the processing, an apparatus whose information processing apparatus ID is Z0012 is required. Further, where the expanded function is inexecutable not due to a mismatched combination of information processing apparatus, but due to an insufficient excess processing capacity, the master apparatus makes reference to the information processing apparatus function database 71 shown in Table 2 above to extract an information processing apparatus that satisfies the processing capacity requirement in step S11. The reference to the information processing apparatus function database 61 is made via, e.g., the server 50.

Note that in the above examples, the number of functions considered is small, and the number of information processing apparatus required for their execution is limited to one. However, in practical operation, cases are considered in which functions become able to be implemented by a combination of many types of information processing apparatus even to perform only one function.

After having created the list of information processing apparatus required to execute the expanded function, the master apparatus selects an information processing apparatus recommended to be newly connected to the network, on the basis of the list in step S12. And the master apparatus presents to the user one or plural information processing apparatus obtained in this processing step to notify the user that the function may not be executed at present but becomes executable when such information processing apparatus is connected (step S13).

Note that the notification in step S13 may be made not only by a method of displaying a message specifically saying "If an information processing apparatus XX is connected, the expanded function YY can be executed" using a dialogue or the like, but also by using an icon of the corresponding information processing apparatus or a photo of the information processing apparatus. Further, the master apparatus may refer to the function database 72 shown in Table 3 above to retrieve a cooperative function therefrom, and display a description of the function together.

Figure 21:
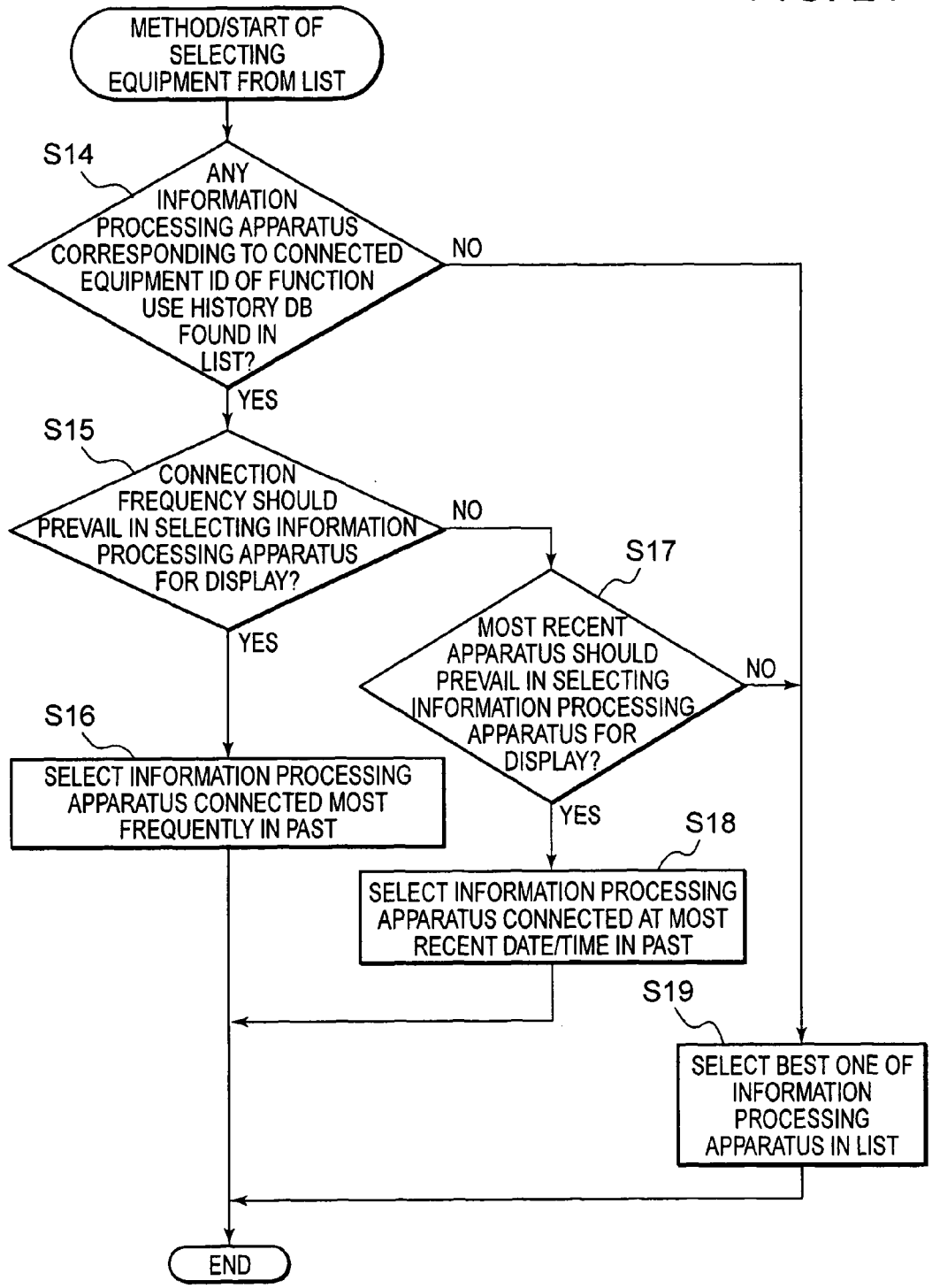
FIG. 21 is a flowchart showing in detail a processing procedure for selecting an information processing apparatus recommended to be newly connected to a network.

FIG. 21 shows, in more detail, a processing procedure for selecting an information processing apparatus recommended to be newly connected to the network from the information processing apparatus list, which is executed in step S12 of the flowchart shown in FIG. 20 above.

First, the master apparatus checks if an apparatus having connected to the network and cooperated with the master apparatus in the past exists in a list of candidate information processing apparatus for connection in step S14. This processing is performed by making reference on the basis of a function use history database such as shown in Table 1 above.

And where equipment of interest exists in the function use history database, the master apparatus selects it on the basis of priority order for equipment selection. In this selection operation, the master apparatus selects the information processing most frequently connected in the past in steps S15, S16. Then, the master apparatus selects information processing connected at the most recent date/time with priority in steps S17, S18. However, the embodiment of the present invention is not necessarily limited to this priority order, and thus, such a selection method as being considered more useful for the user may be set.

Further, where it is determined in step S14 that no equipment entered in the information processing apparatus list exists in the function use history database, the master apparatus arbitrarily selects one from the information processing apparatus list in step S19. In this case, the selection may be based on the gender, age, hobby information, and the like of the user. Furthermore, as to an information processing which is considered the user does not own, the master apparatus can present detailed information about the information processing apparatus or display a link to a Web page so as to usher the user to a purchasing procedure, to perform a display for purchase promotion.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An information processing system configured of a plurality of networked information processing apparatuses, the information processing system comprising:
   a display device;
   at least one processor; and
   a memory device which stores a plurality of instructions, which when executed by the processor, cause the processor to operate with the display device to:
   (a) operate the information processing system as a single virtual information processing apparatus through cooperative operation of the information processing apparatuses;
   (b) acquire apparatus information, or excess processing capacities from the plurality of information processing apparatuses;
   (c) propose expanded functions to be executed using cooperation of the plurality of information processing apparatuses forming the information processing system;
   (d) manage performance or an apparatus configuration that becomes necessary for making each of the expanded functions executable;
   (e) for at least one of the proposed expanded functions, extract performance or an apparatus configuration necessary for executing the at least one proposed expanded function;
   (f) compare with a summation of the acquired apparatus information;
   (g) determine whether the at least one proposed expanded function is executable; and
   (h) response to the determination being the at least one proposed expanded function is not executable:
      (i) determine which unavailable apparatus is required to be added to the information processing system to execute the at least one proposed expanded function; and
      (ii) cause the display device to display apparatus information which indicates the determined unavailable apparatus.

2. The information processing system of claim 1, wherein when executed by the at least one processor, the plurality of instructions cause the at least one processor to manage:
(a) performance and executable functions in each of information processing apparatus;
(b) performance of information processing apparatus necessary for implementing each of the functions; and
(c) functions that become newly executable through cooperative operation of a plurality of information processing apparatuses, respectively.

3. The information processing system of claim 1, wherein when executed by the at least one processor, the plurality of instructions cause the at least one processor to extract and display information indicating a previously inexecutable expanded function that becomes executable through cooperative operation of each of the information processing apparatuses connected to the network with a different information processing apparatus.

4. The information processing system of claim 3, wherein when executed by the at least one processor, the plurality of instructions cause the at least one processor to:
(a) in response to a connection of an additional information processing apparatus, cause an expanded function that was previously inexecutable to become executable, said additional information processing apparatus being different from said plurality of information processing apparatuses; and
(b) cause the display device to display information explicitly indicating the additional information processing apparatus.

5. The information processing system of claim 1, wherein when executed by the at least one processor, the plurality of instructions cause the at least one processor to:
(a) compare a performance or an apparatus configuration necessary for executing an expanded function with a summation of apparatus information or excess processing capacities of the respective information processing apparatus connected to the network; and
(b) determine whether or not the expanded function is executable based on whether or not the summation of the apparatus information or the excess processing capacities are insufficient for the performance or the apparatus configuration that becomes necessary, wherein the determination occurs before an information processing apparatus that becomes necessary is connected.

6. The information processing system of claim 5, wherein when executed by the at least one processor, the plurality of instructions cause the at least one processor to:
(a) search an information processing apparatus that satisfies the performance or the apparatus configuration that is insufficient to execute the expanded function through corresponding databases; and
(b) propose a result thereof.

7. The information processing system of claim 6, wherein when executed by the at least one processor, the plurality of instructions cause the at least one processor to urge a connection of the searched information processing apparatus to the network.

8. The information processing system of claim 5, wherein when executed by the at least one processor, the plurality of instructions cause the at least one processor to:
(a) manage a history of functions used in the past and a history of information processing apparatuses connected to the network in the past in the single virtual information processing apparatus; and
(b) cause the display device to display by priority the information processing apparatus which is connected in the past when displaying information explicitly indicating an information processing apparatus.

9. A method for operating an information processing system including a plurality of networked information processing apparatuses, the information processing system including a display device and a memory device storing a plurality of instructions, the method comprising:
(a) causing a processor to execute the plurality of instructions to operate the information processing system as a single virtual information processing apparatus through cooperative operation of the plurality of information processing apparatuses;
(b) causing the processor to execute the plurality of instructions to acquire apparatus information, or excess processing capacities from each of the information processing apparatuses;
(c) causing the processor to execute the plurality of instructions to propose expanded functions to be executed using cooperation of the plurality of information processing apparatuses;
(d) causing the processor to execute the plurality of instructions to manage performance or an apparatus configuration necessary for making each of expanded functions executable;
(e) causing the processor to execute the plurality of instructions to extract performance or apparatus configuration necessary for making a proposed expanded function;
(f) causing the processor to execute the plurality of instructions to compare with a summation of the acquired apparatus information
(q) causing the processor to execute the plurality of instructions to determine whether or not the proposed expanded function is executable; and
(h) in response to the determination being the proposed expanded function is not executable:
(i) causing the processor to execute the plurality of instructions to which unavailable apparatus is required to be added to execute the proposed expanded function; and
(ii) causing the processor to execute the plurality of instructions to operate with the display device to display apparatus information which indicates the determined unavailable apparatus.

10. The method of claim 9, which includes causing the processor to execute the plurality of instructions to manage:
(a) performance and executable functions in each of information processing apparatus;
(b) performance of information processing apparatus necessary for implementing each of the functions; and
(c) functions that become newly executable through cooperative operation of a plurality of information processing apparatuses.

11. The method of claim 9, which includes causing the processor to execute the plurality of instructions to operate with the display device to extract and display information indicating a previously inexecutable expanded function that becomes executable through cooperative operation of each of the information processing apparatuses connected to the network with a different information processing apparatus.

12. The method of claim 11, which includes:
(a) in response to a connection of an additional information processing apparatus, causing the processor to execute the plurality of instructions to cause an expanded function that was previously inexecutable to become executable, said additional information processing apparatus being different from said plurality of information processing apparatuses; and (b) causing the processor to execute the plurality of instructions to cause the display device to display information explicitly indicating the additional information processing apparatus.

13. The method of claim 9, which includes:
    (a) causing the processor to execute the plurality of instructions to compare a performance or an apparatus configuration necessary for executing an expanded function with a summation of apparatus information or excess processing capacities of the respective information processing apparatus connected to the network; and
    (b) causing the processor to execute the plurality of instructions to determine whether or not the expanded function is executable based on whether or not the summation of the apparatus information or the excess processing capacities are insufficient for the performance or the apparatus configuration that becomes necessary, wherein the determination occurs before an information processing apparatus that becomes necessary is connected.

14. The method of claim 13, which includes:
    (a) causing the processor to execute the plurality of instructions to search an information processing apparatus that satisfies the performance or the apparatus configuration that is insufficient to execute the expanded function through corresponding databases; and
    (b) causing the processor to execute the plurality of instructions to propose a result thereof.

15. The method of claim 14, causing the processor to execute the plurality of instructions to urge a connection of the searched information processing apparatus to the network.

16. The method of claim 13, which includes:
    (a) causing the processor to execute the plurality of instructions to manage a history of functions used in the past and a history of information processing apparatuses connected to the network in the past; and
    (b) causing the processor to execute the plurality of instructions to cause the display device to display by priority the information processing apparatus which is connected in the past when displaying information explicitly indicating an information processing apparatus.

17. A non-transitory computer-readable medium storing instructions structured to cause a computer system including a plurality of networked information processing apparatuses to:
    (a) operate the information processing system as a single virtual information processing apparatus through cooperative operation of the information processing apparatuses;
    (b) acquire apparatus information, or excess processing capacities from each of the information processing apparatuses;
    (c) propose expanded functions to be executed using the information processing apparatuses;
    (d) manage performance or an apparatus configuration necessary for making each of expanded functions executable;
    (e) extract performance or apparatus configuration necessary for making at least one of said proposed expanded functions;
    (f) compare with a summation of the acquired apparatus information;
    (g) determine whether or not the at least one proposed expanded function is executable; and
    (h) in response to the determination being the expanded function is not executable:
        (i) determine which unavailable apparatus is required to be added to execute the at least one proposed expanded function; and
        (ii) cause a display device to display apparatus information which indicates the determined unavailable apparatus.

18. The information processing system of claim 1, wherein when executed by the processor, the plurality of instructions cause the processor to, in response to the determination being the expanded function is not executable, cause the display device to display an information processing apparatus name that is required to be added to the information processing system to execute the expanded function.

19. The information processing system of claim 1, wherein when executed by the processor, the plurality of instructions cause the processor to, in response to the determination being the expanded function is not executable, cause the display device to display an information processing apparatus model number that is required to be added to the information processing system to execute the expanded function.

* * * * *